United States Patent [19]
Rybczynski

[11] Patent Number: 5,659,382
[45] Date of Patent: Aug. 19, 1997

[54] IMAGE CONVERSION PROCESS AND APPARATUS

[75] Inventor: Zbig Rybczynski, Berlin, Germany

[73] Assignee: CFB Centrum fur neue Bildgestaltung GmbH, Berlin, Germany

[21] Appl. No.: 355,315

[22] Filed: Dec. 12, 1994

Related U.S. Application Data

[63] Continuation of Ser. No. 130,674, Oct. 4, 1993, abandoned, which is a continuation of Ser. No. 837,485, Feb. 18, 1992, abandoned.

[51] Int. Cl.$^6$ ...................................................... G03B 19/18
[52] U.S. Cl. ............................................. 352/46; 352/239
[58] Field of Search .............................. 352/85, 87, 239, 352/46

[56] References Cited

U.S. PATENT DOCUMENTS

| | | |
|---|---|---|
| 1,815,455 | 7/1931 | Waller . |
| 3,511,567 | 5/1970 | Dejoux . |
| 4,672,442 | 6/1987 | Yamaguchi et al. . |
| 4,889,423 | 12/1989 | Trumbull . |
| 4,891,701 | 1/1990 | Shikina et al. . |
| 5,084,763 | 1/1992 | Naradate et al. . |
| 5,153,620 | 10/1992 | Songer . |
| 5,181,111 | 1/1993 | Hedley et al. . |
| 5,349,385 | 9/1994 | Glenn . |

OTHER PUBLICATIONS

Pešl, Aleš, "New Illuminating System Design for Transmission Film Copying," *Journal of Electronic Imaging*, vol. 1, No. 1, Jan., 1992, pp. 29–34.

*Primary Examiner*—David M. Gray
*Attorney, Agent, or Firm*—Gottlieb, Rackman & Reisman

[57] ABSTRACT

A process for transferring images from a first frame system to a second frame system is described. A first sequence from the first frame system is determined so as to include a plurality of image frames, wherein each image frame includes a central timing factor. Likewise, a second sequence from the second frame system is selected so as to include a plurality of image frames, wherein each image frame includes a central timing factor. Each image frame for the newly constructed second frame system is built by combining at least two image frames from the first frame system in a proportion such that the central timing factors of the two image frames of the first frame system combine so as to correspond to the central timing factor for the image frame in the second frame system. In this manner, the images from the first frame system combine in a smooth fashion in the second frame system such that jitter, freezes and jumps are eliminated. This image transfer process may be used to transfer images between the following frame systems: NTSC TV; PAL TV; Film 16; Film 24; Film 60 (Showscan system); and Computer images.

13 Claims, 18 Drawing Sheets

IMAGE CONVERSION PROCESS AND APPARATUS

RELATED APPLICATION DATA

This application is a continuation in part of U.S. patent application Ser. No. 08/130,674, filed Oct. 4, 1993, which application is a continuation of U.S. patent application Ser. No. 07/837,485, filed Feb. 18, 1992. Each of these priority applications is now abandoned. These applications are entirely incorporated herein by reference.

BACKGROUND OF THE INVENTION

In the film and television industry, several different standards for frame systems exist in which it is defined how motional processes have to be recorded on video or film by means of a necessarily discrete number of single frames. There is a permanent demand to reproduce image material of a special frame system by means of a projection system which is destined for another frame standard. This image material, therefore, first has to be prepared for the frame system of the projection or reproduction, respectively. This process is called image conversion or image transfer, respectively.

The present invention relates to conversion of television, computer or film images originated in a specific system of recording (i.e., a specific number of frames per second) to a system of projection designed for another system of recording (having a different number of frames per second). In this application, these different systems of recording will be referred to as "frame systems."

There are six main frame systems. They are as follows:

1. NTSC TV—60 frames/sec ("American" standard);
2. PAL TV—50 frames/sec ("European" standard);
3. Film 16—32 frames/sec (Archive films);
4. Film 24—48 frames/sec (standard of motion-pictures);
5. Film 60—120 frames/sec ("Showscan" system); and
6. Computer images—Programmable number of frames/sec.

Each of these frame systems will be discussed in more detail below.

1. NTSC Television—NTSC has nominally 30 "frames" per second. However, every frame includes two separate half images called "fields." These two fields construct an NTSC video frame in such manner that the first field supplies the image information for all lines with an odd number and the second field supplies the image information for all other lines, i.e., those with even numbers. NTSC video frames therefore are called interlaced frames.

Therefore, because every field represents a different time interval, each field must be considered as a separate image. Thus, it should be considered that NTSC has 60 frames per second (fps).

2. PAL Television—PAL has nominally 25 "frames" per second. As with NTSC, however, every frame includes two separate images called "fields," which are interlaced images. Again, because every field represents a different time interval, each field must be considered as a separate image. Thus, it should be considered that PAL has 50 fps.

3. Film 16—Films produced before the introduction of sound were photographed with 16 "frames" per second. These frames can literally be seen when examining a strip of an archive film. However, during film recording and projection, there were actually 32 changes of the image per second, but only 16 of these changes represented images (i.e., "image frames"). The other 16 changes produced a black image which was the result of a closed shutter during the transportation of the film strip (i.e., "black frames"). They can be recognized on the film material as being unexposed strips between the exposed frames.

In the analysis of the motion effect in film, the importance of these invisible black images is equal to the importance of the visible images. Therefore, it should be considered that Film 16 has 32 fps.

4. Film 24—Film 24 has nominally 24 "frames" per second. These frames also can literally be seen when examining a strip of the film. As with Film 16, however, during film recording and projection there is actually twice this number of changes of the image per second, i.e., here 48 changes. Only 24 of these changes represent images (i.e., "image frames"). The other 24 changes produce a black image which was the result of a closed shutter during the transportation of the film strip (i.e., "black frames"). Thus, it should be considered that Film 24 has 48 fps.

5. Film 60—Showscan film has nominally 60 "frames" per second. These frames also can literally be seen when examining a strip of the film. There are 120 changes of the image per second during film recording and projection, but only 60 of these changes represent images (i.e., "image frames"). The other 60 changes produce a black image which was the result of a closed shutter during the transportation of the film strip (i.e., black frames"). Thus, it should be considered that Film 60 has 120 fps.

6. Computer Images—Computer images are artificially generated images which do not "photograph" reality. Movement (animation) is a calculated process which can be designed according to any of the frame systems. If computer images were designed for a particular frame system and had to be transferred to another frame system, they would need to be treated as another individual frame system. High Definition Television (television of the future) is an upgrade of NTSC and PAL standards and operates with a precise number of fps (precisely 60 fps and 50 fps).

NTSC and PAL have a frame rate slightly differing from 60 or 50 frames per second, respectively. It is, however, important for the image conversion between two systems that 60 NTSC frames and 50 PAL frames take exactly the same time, namely, approximately one second (exactly 1.0010 secs.).

As long as recorded images are projected or displayed, respectively, based on the frame system in which they were originally recorded, the effect of motion on the screen, in every case, is more or less satisfactory.

In recording original images, the best results of reproduction of motion occur in NTSC and Film 60 because these frame systems have the highest number of frames per second. The higher number of fps, the better the human eye perceives the effect of motion, i.e., the motion is smooth.

The worst original frame system for recording motion occurs in Film 16. In the case of Film 16, however, the real motion effect of the originally recorded films (at 32 fps) cannot be seen because the original means of image projection no longer exists. The "speeded up" effect of archive films is the result of modern film projection at 48 fps (FILM-24). This invention provides an opportunity to "restore" the original motion to these films.

Two types of distortion appear during film and television projections. One type of distortion is called "strobe-flicker", and the second type of distortion is called "jitter." Strobe-flicker is solely a consequence of a frame rate being too low for the creation of a flowing motion. Because of the different basic technologies of film and video on film screens or television monitors, respectively, different kinds of strobe flicker appear. This kind of disturbance, however, is in no way related to the effects which origin in the conversion of images from one frame system into another frame system.

Image jitter, on the contrary, arises from the currently applied—purely mechanical—methods of image conversions: the systematic leaving out or repetition of single images of the original system in the target system causes interruptions of the recorded motion. Since this disturbance is repeated in dependence of the frame rate in shorter or longer periods, the impression of a jittery image is caused.

U.S. Patent Nos. 1,815,455, (Waller) and 5,153,620 (Songer) try to eliminate strobe-flicker. Though, as mentioned above, strobe-flicker is not caused by image conversion, a short discussion of both patents seems to be necessary since they describe methods which are just apparently related to those of the present invention.

Waller's process seeks to reduce strobe-flicker by representing the immediate past several film frames and the immediate future several film frames on one film frame. This super-imposition results in an interesting visual effect—a "fan" of motion is built into each frame. However, this "fan" effect does, as easily can be seen, not solve the strobe-flicker or jitter problems. The Songer patent discloses superimposing two frames in one frame at an equal rate in an attempt to reduce strobe-flicker in film projection. Such superimposition results in blurred images and does not solve the strobe-flicker or jitter problems.

The methods according to Waller and Songer are not directed to reproduce the produced image material within another frame system, since the number of frames per time unit is not altered. Double or multiple exposure at constant frame rate cannot solve the image conversion problem, and furthermore, this method leads to a deterioration (blurring) of the produced image material as compared to the original material.

Today, on every frame system, images are projected which were originally recorded in other frame systems. If the original number of frames are simply mechanically projected in the new frame system (as in the case of archive Film 16), serious disturbances in the reproduction of the motion and sound would occur. For example, projection of video originally recorded in NTSC on a PAL system would appear slowed down, and projection of video originally recorded in PAL on a NTSC system would appear speeded up. To preserve the original effect of the recording, it is necessary to change the number of frames of the recorded material to the number of frames required by the system on which this recorded material is projected. This process of frame number adjustment is known as "transfer".

The known methods for transferring images from one frame system to another frame system cause jitter. The reasons therefor are explained in more detail below.

When viewing an object with the eye, normal people see one image at a time. This image is in constant motion. However, technology does not exist to record this type of image. Rather, motion is recorded as a stream of separate still frames.

In order to achieve the fluid effect of motion on the screen, an uninterrupted stream of preferably at least 60 separate still images must be observed to create an illusion of constant motion. This is the principle for every frame system. Any interruption of the stream of images (i.e., by missing or repeated frames, or improper time presentation in a frame) causes a disturbance in the visual perception of motion. Deleting a frame causes a "hole" in the motion, and the repetition of a frame causes a "freeze" of the action. To more simply and better illustrate these and additional problems caused by mechanical transfer techniques, first the example of a clock face will be used.

The object of examination is the second hand of a clock. Assume that this second hand is filmed in a frame system which records only 1 fps, and four seconds of time are being analyzed. Every frame of recorded material will represent one tick of the second hand. When this material is projected on a system whose projection requires three frames of material during a 4 second duration (i.e., every frame is projected for 1.33 seconds), and a method of mechanical transfer is applied, one frame from the recorded material is removed. Thus, one tick of the second hand is removed. A "jump" in the second hand's motion will appear on the screen. This jump is caused by the missing frame of the removed tick.

Using this same example, if the original filming is done in a frame system which records 3 frames in 4 seconds, then every frame of recorded material represents 1.33 ticks of the second hand. If this material is projected on a system whose projection requires 4 frames of material during a 4 second duration, and a method of mechanical transfer is applied, one of the frames of the recorded material must be repeated. Thus, one tick of the second hand will have to repeated. A "freeze" in the motion of the hand will appear on the screen. This freeze is caused by the repeated tick.

In addition to the "jump" or "freeze,' in both examples, the remaining frames also represent incorrect visual information. In the case where frames are removed (the "jump"), every frame is projected for 1.33 seconds, but the action actually shown in that frame represents only 1 second. In the case where frames are repeated (the "freeze"), every frame is projected for 1 second, but the action actually shown in that frame represents 1.33 seconds.

Thus, when using mechanical transfer processes, none of the transferred images represent the correct time and motion. All disturbances caused by mechanical transfer will be referred to as "jitter". Although none of the existing frame systems operate with 1 or 1.33 fps, but rather with 32, 48, 50 or 60 fps, mechanical transfer methods in the conventional frame systems causes the same jitter effects as described above.

While several attempts to solve jitter have been made by many companies in the world, no satisfactory solution to the problem has been developed.

U.S. Pat. Nos. 3,511,567 (Dejoux) and 4,889,423 (Trumbull) relate to transferring images in the motion picture and television industries. These patents are entirely incorporated herein by reference. Because these transfers are based on cutting out or repeating frames, these processes will be referred to in this application as "mechanical transfer" processes. These patents describe methods of transfer based on the following principle: if there are too many frames in the originally recorded material, then excess frames are removed. If there are not enough frames in the originally recorded material, certain frames must be repeated to provide the necessary amount.

The method of transfer described in the Dejoux patent has been practiced in the television industry for many years. However, this method of transfer does not solve the jitter problem. In fact, the Dejoux method actually causes jitter.

Trumbull discloses a method for converting from a high frame rate motion to a low frame rate motion. This is done by superimposing some images and cutting out some images. The method of Trumbull would not solve the jitter problem because the timing of the original frame system is not maintained. Furthermore, Trumbull's method would cause strobe-flicker because the human brain can distinguish twenty-four separately projected images per second.

This problem shall be explained by means of another example:

FIG. 1 illustrates a sequence of four image frames which would be produced by cinemagraphic exposure of four frames of film to an image field consisting of a moving circular object. For convenience, time durations are calibrated in degrees, wherein 360° represents a sequence of four film images corresponding to a time of ⅙ sec. As illustrated in FIG. 1, the moving circular object forms an elongated image on each frame corresponding to the motion of the object during the frame exposure interval (45° or ⅛ sec.). The centers of each of the four frame images illustrated are equally spaced by a time (or angle) corresponding to the image frame rate. Since it is assumed that the object is undergoing uniform linear motion, there is an equal distance between the centers of the object in the time adjacent frames and an equal spacing between the adjacent image edges in time adjacent frames. When the frames are viewed, using the standard used in recording, a viewer perceives the object moving with uniform linear motion.

FIG. 2 illustrates the series of cinemagraphic images which would result from filming the same circular object with uniform linear motion using 60 field per second television video recording and converting to cinemagraphic film 24 using the prior technique. It may be observed from FIG. 2 that the object images in each of the four frames are elongated with respect to the images that would have been obtained by original exposure using cinemagraphic techniques, and that the images on film frame 1 and film frame 2 are overlapping, while the image on film frame 2 is substantially separated from the image on film frame 3. When this film is viewed using a Film 24 projector, the viewer perceives a slower object motion during the transition from frames 1 to frame 2 and accelerated, non-uniform object motion during the transition from film frame 2 to film frame 3, giving a perception of image "jitter".

Prior to the instant invention, all existing methods of image transfer, e.g., between NTSC and PAL, were based on mechanical methods. This means a frame is always either removed or repeated. In the newest, improved methods of mechanical transfer, all efforts are concentrated on "smoothing out" either the "hole" or the "freeze". However, these smoothing out techniques do not adequately solve the problem. Smoothing out the jitter results in a loss of focus quality, and it does not solve the problem that every frame represents incorrect time.

In order to achieve the correct time-motion relation, without causing jitter, it is necessary to create a method of transfer which produces frames in the transfer recording medium which possess the identical characteristics as the frames recorded in the original projecting system. In all cases it is necessary to create completely new frames. This invention relates to methods of transfer which preserve the original time-motion relation.

SUMMARY OF THE INVENTION

The invention relates to a process for transferring images from a first frame system to a second frame system which causes no image disturbances and time changes with respect to the image motion information as the prior mechanical conversion methods do.

A first sequence from the first frame system (i.e., the originally recorded frame system) is determined so as to include a plurality of image frames.

Likewise, a second sequence from the second frame system (i.e., the newly constructed frame sequence) is determined so as to include a plurality of image frames.

Each image frame for the newly constructed second frame system is built by actively superposing at least two image frames from the first frame system in a specific proportion such that the time distances of the image frames of the first sequence to the newly built image frames are reflected by individual weighing factors.

In this manner, the images from the first frame system combine in a smooth fashion in the second frame system such that jitter, freezes and jumps are eliminated. This image transfer process may be used to transfer images, for example, between the following frame systems: NTSC TV; PAL TV; Film 16; Film 24; Film 60 (Showscan system); and Computer Images.

In the process in accordance with the invention, every frame is created from scratch and none of the existing original frames are used as such in the newly constructed frames.

Therefore, for each frame of the target sequence to be produced, those two frames of the original sequence have to be found which are most similar to this frame with respect to the time which is represented by this frame during the recording. Furthermore, the degree of time coincidence between these two frames has to be determined. This degree of time coincidence defines the percent value of contribution of one frame of the original sequence in the production of the new frame of the target sequence. This percent value is—contrary to currently existing methods—variable for the several frames of a sequence of frames (in the following: basic frame sequence). Possible methods for the generation of a new image are double exposure (film) or electronic frame generation (video). In each of these two methods, the weighing of the original frames has to be realized by specific means.

Even the image conversion process of this invention teaches not to take account of single frames of the original frame sequence in the generation of the target sequence. This, however, is completely in accordance with the aims of this invention and causes no disruption of the impression of motion which is perceived during the reproduction. This happens to frames which are completely within a time interval which is represented by a "black frame" of the target system or to frames which are not one of those two frames which are most closely neighbored to an image to be produced. Therefore, in practice, the elimination of a frame in an original frame sequence is restricted to those conversions in which the original system is a frame system with a high frame rate and the target system is a film frame system with a low frame rate (e.g., in the conversion of NTSC to Film 16).

BRIEF DESCRIPTION OF THE DRAWINGS

The advantageous aspects of the invention will be more fully appreciated when considered in conjunction with the following detailed description and the attached drawings, wherein:

In FIGS. 6 to 14, the vertically hatched segments represent "black", non-exposed, frames.

DETAILED DESCRIPTION OF THE INVENTION

In pictures transferred by the process of mechanical transfer, no jitter exists when there is no recorded motion on the film or tape (i.e., when there is no movement inside the frame). The jitter becomes visible only when motion occurs. This explains why certain projected scenes look very good or very bad. Due to many varying factors (e.g., pan, tut, zoom, etc.), it is very difficult to determine the "intensity' of jitter. It is difficult to correct this problem because recorded frames are individual still images which do not have "visible" mathematical information about motion and time.

Figure 3:
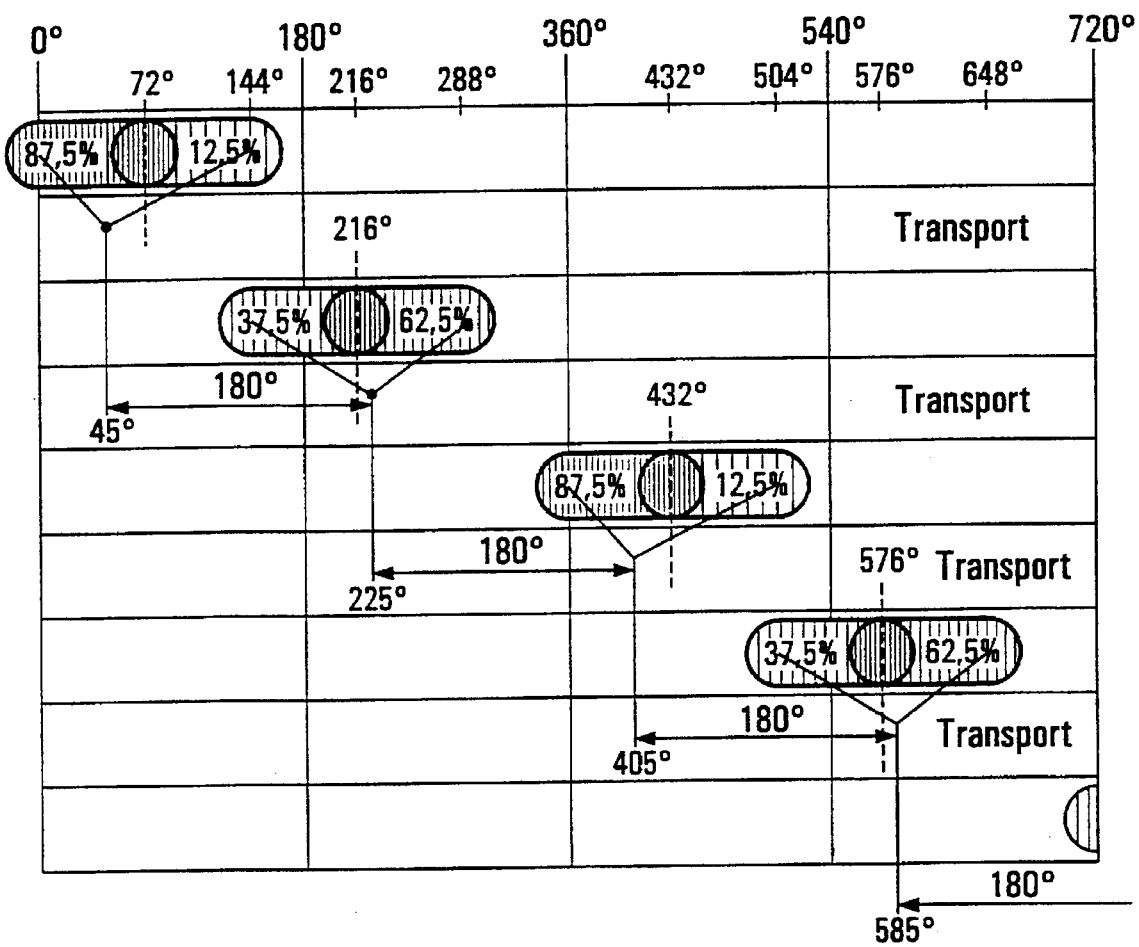
FIG. 3 is a diagram illustrating the images of a moving object as it would appear on cinematographic film converted from television video in accordance with the first preferred method of the present invention.

FIG. 3 is an illustration of a technique according to the first preferred embodiment of the invention wherein the exposure intensities of time adjacent NTSC television field images are varied according to the overlap of each television field time interval with the corresponding adjacent cinemagraphic frame FILM 24 time interval. According to this embodiment of the invention, the cinemagraphic film frames are produced using the following frame intensities:

F1=87.5% 1A+12.5% 1B
F2=37.5% 2A+62.5% 2B
F3=87.5% 3B+12.5% 4A
F4=37.5% 4B+62.5% 5A

Fields 3A and 5B are not used.

It may be noted that for convenience, I have designated these intensities by assigning film frame F1 to a time interval which starts at the same time as the television film interval 1A. Those skilled in the art will recognize that other possibilities may be used, by merely time shifting the start on film frame F1 with respect to television field 1A, which will result in different percentages being used, but still following the same principles of proportioning field image intensity according to time interval overlap of the fields with the corresponding frame exposure time interval.

According to the method illustrated in FIG. 3, each of the cinemagraphic frame images is generated using image information from time adjacent television video field images with a weighted image intensity, wherein the weighing of the intensity of each television field image corresponds to the time overlap of the television video field interval with the cinemagraphic frame time interval.

Figure 1:
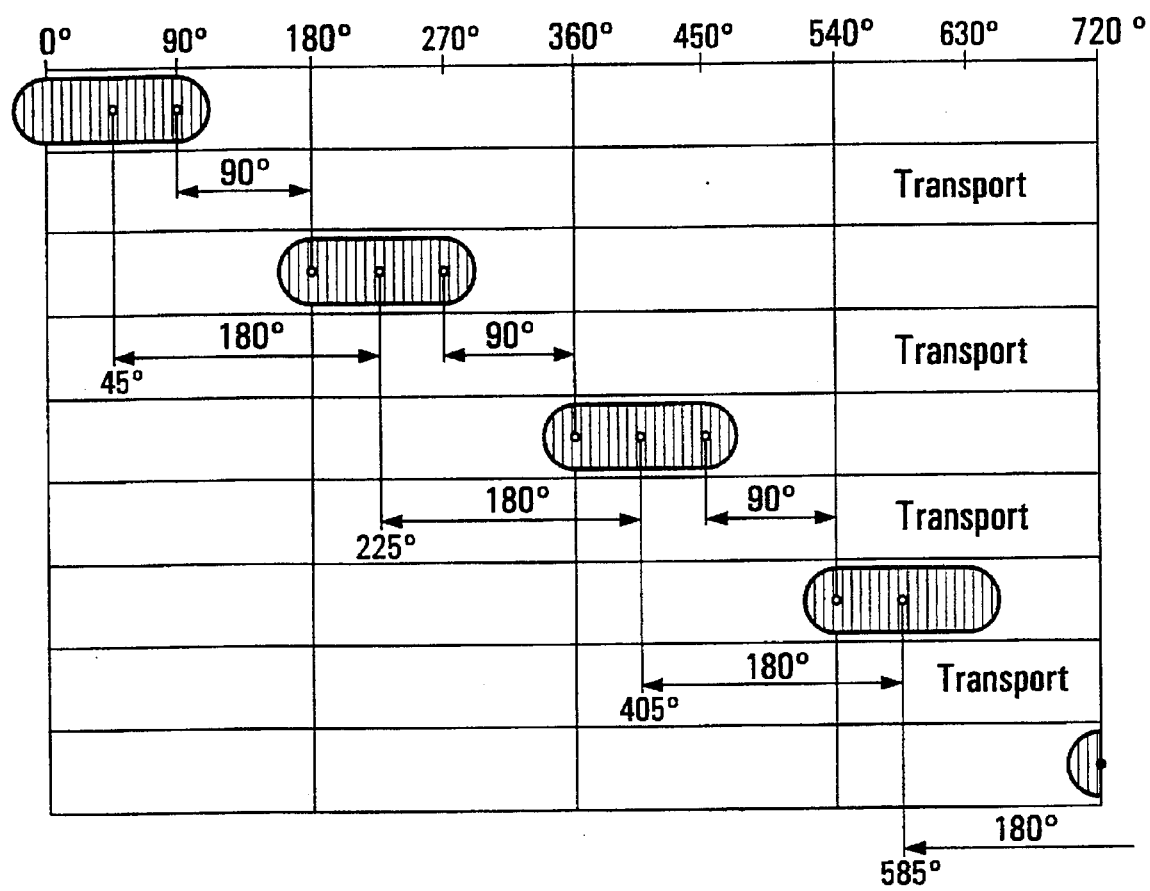
FIG. 1 is a diagram illustrating the image of a uniformly moving circular object as it would appear on sequential frames of a cinematographic film.
Figure 2:
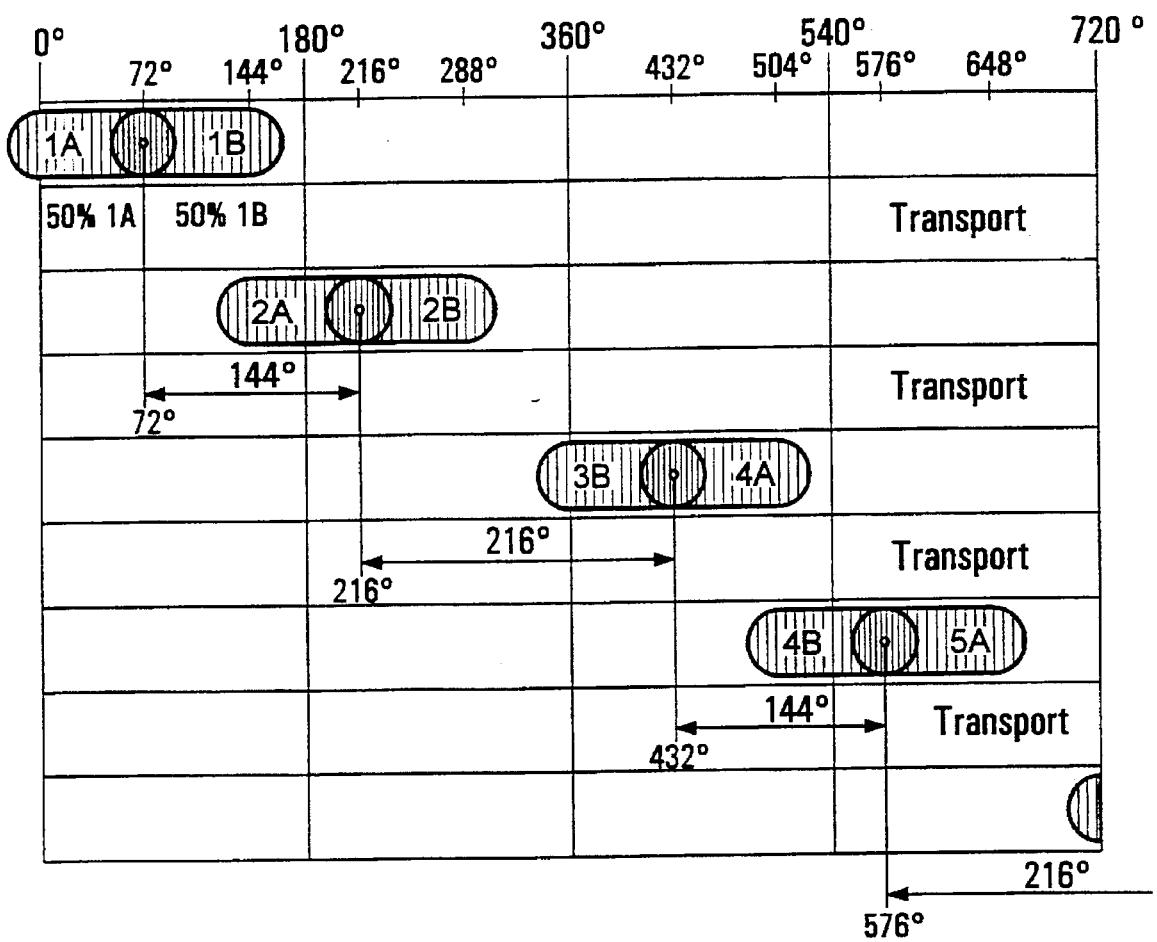
FIG. 2 is a diagram illustrating the image of a moving object as it would appear in cinematographic film converted from television video signals using known transfer techniques.

The resulting cinemagraphic frame F1 image shown in FIG. 3 includes a relatively dark elongated image of the moving circular object within the position corresponding to television field 1A and a relatively light image for positions corresponding to television field 1B, accordingly producing an elongated image with a "shadow". The inventor has observed that viewing this image with the "shadow" provides the viewer with the same perceived effect, i.e., perceived position of the moving object, as would be produced by the film image shown in FIG. 1.

In a similar manner, the television video images of fields 2A and 2B are combined according to the invention with exposure intensities which correspond to the time overlap of television fields 2A and 2B in the cinemagraphic frame F2. The result of the double image thereby produced is to provide perception of an object in a position closer to the position corresponding to the field 2B.

As already mentioned above, consequently, it is essential for the invention that each frame of a frame sequence to be produced in a predetermined standard is synthesized from frames which have been recorded in another standard, wherein the original frame sequence and the frame sequence to be produced are assigned to a common time axis or scale. The image contents of those frames of the original frame sequence which temporally overlap with a new frame to be produced or which are the next neighbors to this frame are used for the new frame. Herein, an intensity weighing coefficient is assigned to each frame of the original frame sequence to be used, wherein the intensity weighing factor determines the contribution of the original frame to the new frame. This weighing coefficient is dependent on the degree of temporal overlap or distance, respectively, of the original frame to the new frame to be produced on the time scale.

In the process according to the invention, a common starting point and time for the source frame sequence and the target frame sequence to be produced is determined. Then, a location in time of each frame of the source frame sequence, as well as the location in time of each frame of the target frame sequence to be produced is determined. For each frame of the target frame sequence to be produced, the temporally next neighboring frames (preferably two frames) of the source frame sequence are determined. A temporal distance or offset, respectively, of the respective time intervals of the next neighboring frames of the source frame sequence with respect to a time interval of the frame of the target frame sequence to be produced is determined, based on their respective characteristic points, preferably corresponding to the central point of the respective time intervals. For each of the next neighboring frames of the source frame sequence, a frame specific, normalized intensity weighing coefficient is determined which depends on the temporal distance or offset, respectively, of the corresponding time interval with respect to the time interval of the frame of the target frame sequence to be produced. The frame of the target frame sequence to be produced is formed by additively superimposing the next neighboring frames of the source frame sequence, each being multiplied by its corresponding intensity weighing coefficient.

Preferably, the source frame sequence is recorded on a recording medium and/or the target frame sequence will be recorded on to a recording medium.

In one version of the invention, the source frame sequence is available in digital form, and the additively superimposing is carried out by pixel-by-pixel addition of the next two neighboring frames from the source frame sequence, wherein the level of the signals to be added is adjusted according to the corresponding intensity weighing coefficient. In another version, the next neighboring frames of the source frame sequence are available in analog form as a photochemically produced record, and these frames are digitalized prior to additively superimposing them. Alternatively, the additively superimposing may be carried out by multiple exposure of a frame area of a recording medium of the target frame sequence with the next neighboring frames of the source frame sequence, wherein the exposure intensity and/or exposure time is adjusted according to the intensity weighing coefficients.

In the case where the synthesis is carried out for forming a new i-th frame $F_{i,T}(t_i)$ with a time interval with a characteristic point $t_i$ of the target frame sequence T, the process includes superimposing two frames $F_{j,s}(t_j)$ of the source frame sequence S including the characteristic points $t_j$ or $t_{j+1}$, respectively, the next neighboring frames being neighbored to the time $t_i$, the i-th frame $F_{i,T}(t_i)$ is formed in accordance with the relation:

$$F_{i,T}(t_i)=C_{j,s} \cdot F_{j,s} C_{j+1,s}(t_j)+C_{j+1,s}(t_{30\ 1}),$$

wherein i and j are integers and $C_{j,s}$ $C_{j+1,s}$ are the intensity weighing coefficients for the j-th or (j+1)-th source frame, respectively, and are evaluated as normalized weighing coefficients $$C_{j,s}=1-(|t_i-t_j|)/(t_{j+1}-t_j),$$

$$C_{j+1,s}=1-(|t_{j+1}-t_i|)/(t_{j+1}-t_j).$$

To further explain the process of this invention, a simple conceptual "device" which will be called the "Rotating Wedge" has been developed. Using the Rotating Wedge, every frame in the new frame system is assigned a mathematical value. This allows for the necessary calculations to enable the image transfer.

Figure 4A:
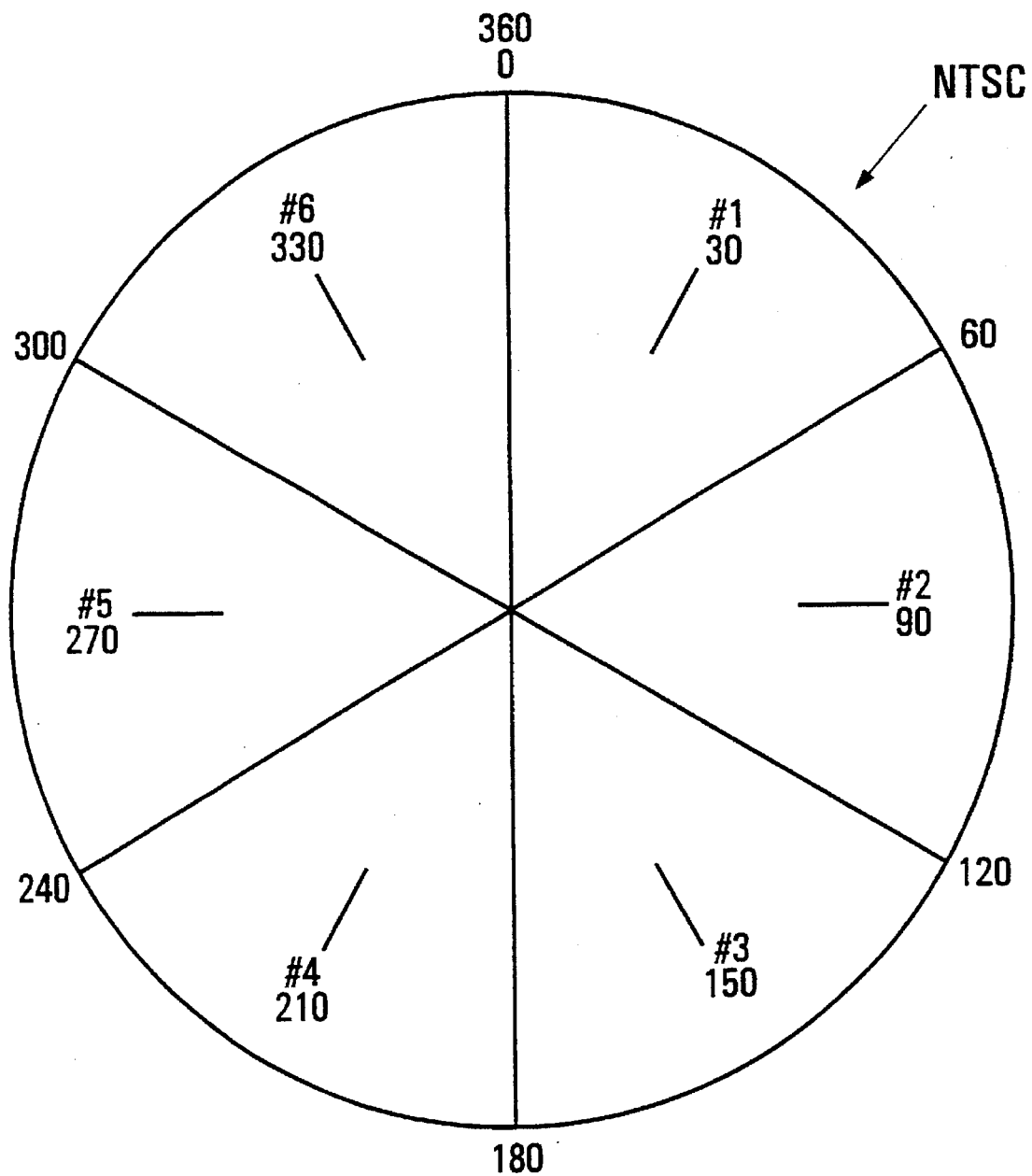
FIG. 4a is a timing diagram illustrating the NTSC frame system.
Figure 4B:
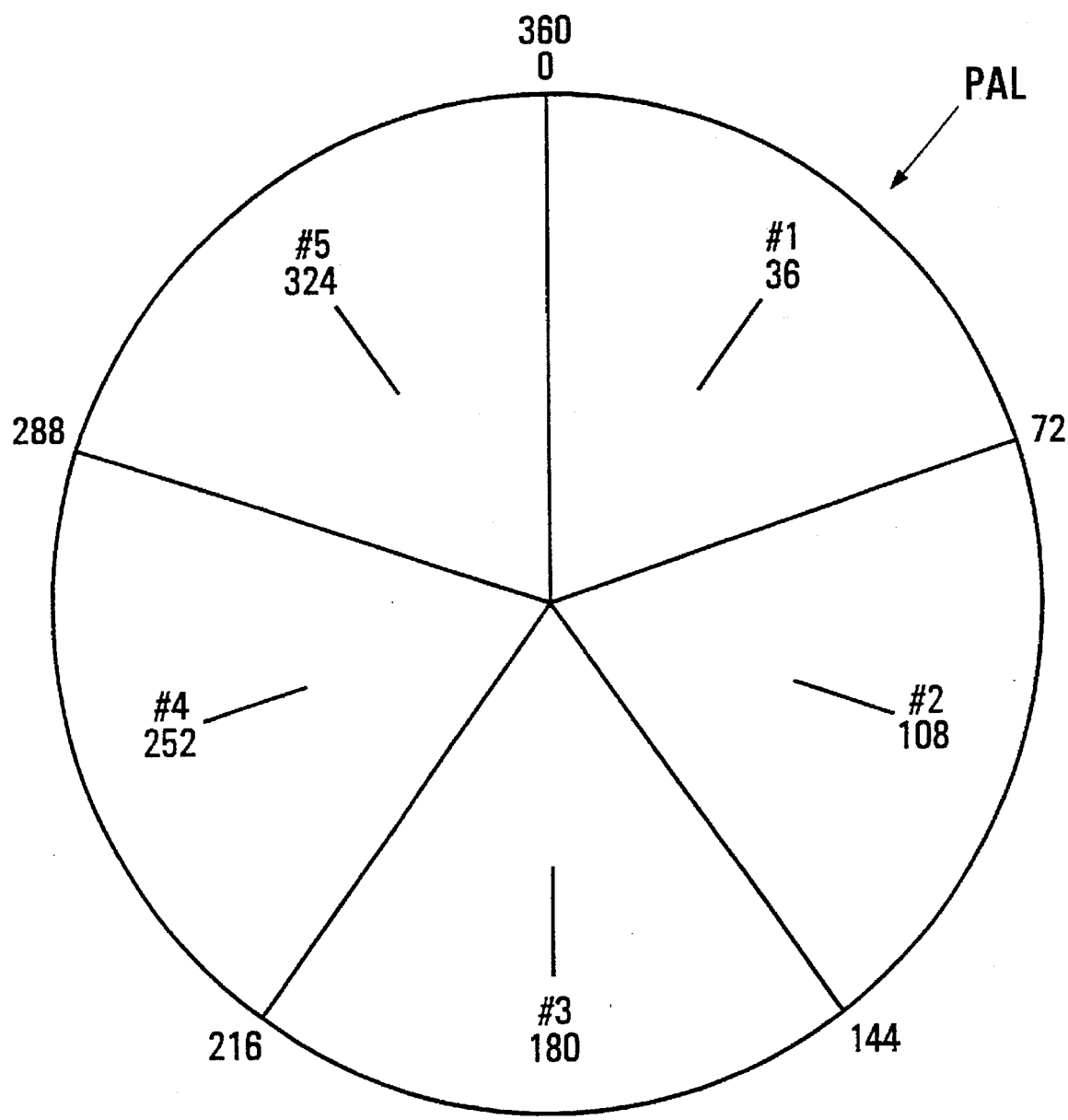
FIG. 4b is a timing diagram illustrating the PAL frame system.

The Rotating Wedge uses the principle of the clock hand as described above. In the two different frame systems, a "sequence" is the duration of time when a full number of frames being as small as possible occurs in both systems. For example, in comparing PAL and NTSC, as shown in FIGS. 4a and 4b, the first full sequence appears after 6 frames of NTSC (FIG. 4a) and after 5 frames of PAL (FIG. 4b). The duration of the sequence is 0.1 seconds (in NTSC: 0.0167 s/frame multiplied by 6 frames=0.1 sec., and in PAL: 0.02 s/frame multiplied by 5 frames=0.1 sec.).

In the process of transfer, new frames must be built for the duration of a sequence and consistently repeated for the succeeding sequences. In the above-mentioned example, when transferring from NTSC to PAL, from the 6 original frames of NTSC (in 0.1 sec.), 5 new frames of PAL must be built (corresponding to 0.1 sec.). Conversely, when transferring from PAL to NTSC, from the 5 original frames of PAL, 6 new frames of NTSC must be built. New frames must be built in this manner and consistently repeated for each sequence in the film.

To explain the principle of the Rotating Wedge, imagine a white clock hand on a black surface rotating with the speed of 360 degrees per sequence. If this clock hand is recorded on NTSC, the full rotation will be recorded on 6 frames. During exposure of every frame, the white hand will draw a 60 degree wedge (360 degrees divided by 6 frames). See FIG. 4a. If this clock hand is recorded on PAL, the full rotation will be recorded on 5 frames. On every recorded frame, the hand will draw a 72 degree wedge (360 degrees divided by 5 frames). See FIG. 4b.

In this manner, every frame of the sequence has a mathematical value, and it is possible to analyze the relationship between the frames in mathematical terms.

NTSC—PAL:—Duration of the sequence is 0.1 sec.
NTSC—from FIG. 4a
Frame #1=from 0° to 60°
Frame #2=from 60° to 120°
Frame #3=from 120° to 180°
Frame #4=from 180° to 240°
Frame #5=from 240° to 300°
Frame #6=from 300° to 360° (360°=0°)
PAL—from FIG. 4b
   (a=previous sequence; b=next sequence)
Frame #5a from 288° to 360° (360°=0°) (The last frame of the previous sequence)
Frame #1=from 0° to 72°
Frame #2=from 72° to 144°
Frame #3=from 144° to 216°
Frame #4=from 216° to 288°
Frame #5=from 288° to 360° (360°=0°)
Frame #1b=from 0° to 72° (The first frame of the next sequence)

Using these mathematical values for each frame, it now is possible to find a "center" or "central timing factor" for every frame as follows:
NTSC Centers of Frame (from FIG. 4a):
Frame #1=30°
Frame #2=90°
Frame #3=150°
Frame #4=210°
Frame #5=270°
Frame #6=330®
PAL Centers of Frame (from FIG. 4b):
Frame #5a=−36° (324° from the previous sequence)
Frame #1=36°
Frame #2=108°
Frame #3=180°
Frame #4=252°
Frame #5=324°
Frame #1b=396° (36° from the next sequence)

Figure 5:
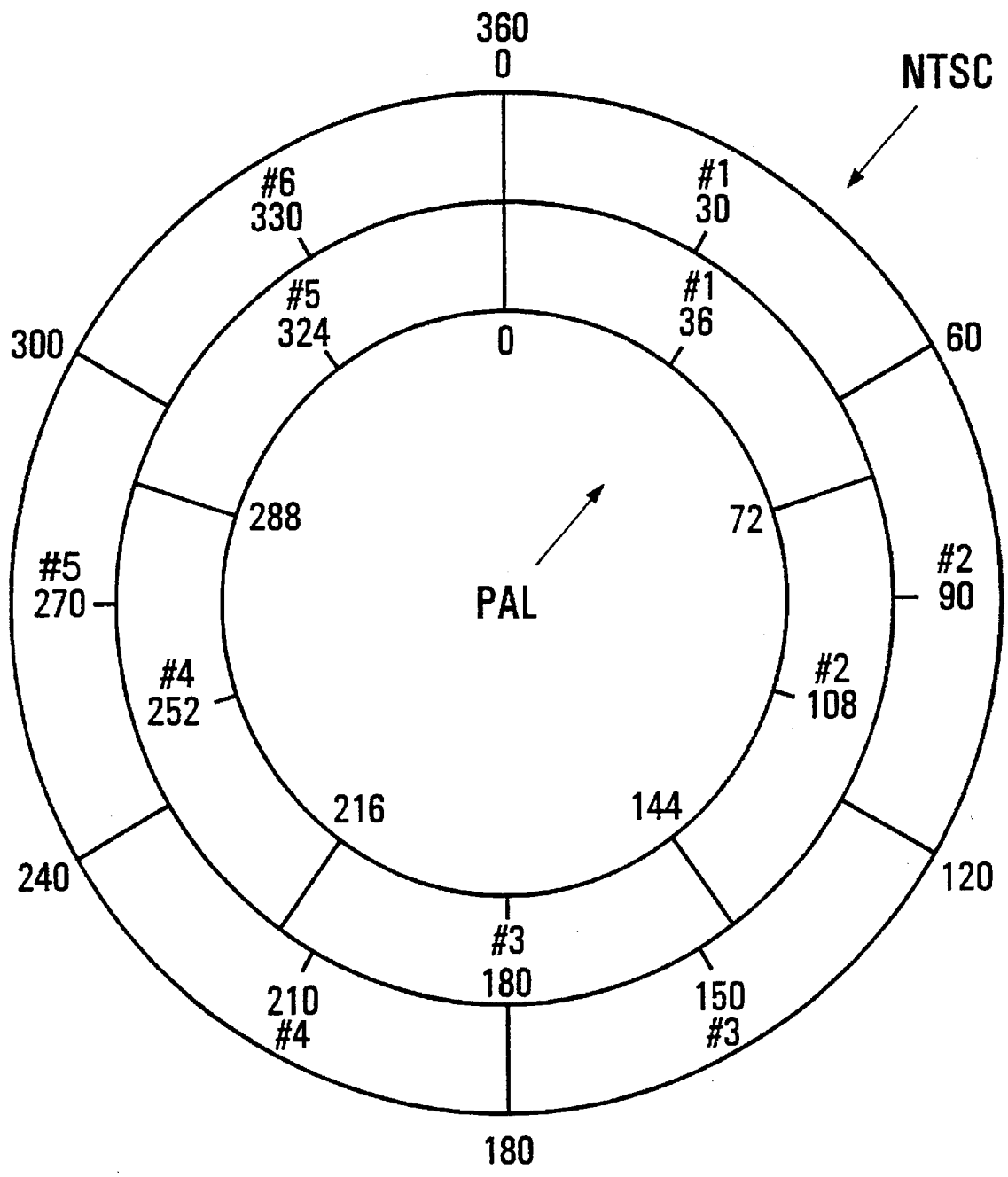
FIG. 5 is a rotating wedge diagram showing the NTSC and PAL frame systems and the timing relationship therebetween.

These values form the basis for establishing the time relations between the several frames of both frame systems and for the evaluation of the corresponding weighing coefficients. For graphically displaying these processes, the principle of the rotating wedge is extended to combine the transfer specific wedge diagrams of both frame systems involved in the conversion to a single, concentric wedge diagram. From such a diagram, it can immediately be seen which two frames of the original system have to be correlated to produce a predetermined frame of the target system within a basic frame sequence. In FIG. 5, this has been carried out for the conversion between NTSC-PAL. In the following, by means of an example, the frame correlation between the frame systems and the evaluation of the weighing coefficients will be described.

The centers of each frame in one system may now be analyzed from the perspective of the other system. This consideration of the frame system perspectives between NTSC and PAL may be more easily seen in FIG. 5, which shows the PAL sequence and the NTSC sequence superimposed on one another on the same circular scale. For example, from the NTSC "perspective", NTSC Frame #2 (having its center at 90°) is 18 degrees "ahead" (or earlier) in time compared to PAL Frame #2 (having its center at 108°), but "later" in time by 54 degrees as compared to PAL Frame #1 (having its center at 36°). All of the frames from the NTSC system can be analyzed in this manner as follows:

A. NTSC #1 (having its center at 30°) is 6° ahead of PAL #1 (having its center at 36°), but 66° later than PAL #5a (having its center at −36° (from the previous sequence));
B. NTSC #2 (having its center at 90°) is 18° ahead of PAL #2 (having its center at 108°), but 54° later than PAL #1 (having its center at 36°);
C. NTSC #3 (having its center at 150°) is 30° ahead of PAL #3 (having its center at 180°), but 42° later than PAL #2 (having its center at 108°);
D. NTSC #4 (having its center at 210°) is 42° ahead of PAL #4 (having its center at 252°), but 30° later than PAL #3 (having its center at 180°);
E. NTSC #5 (having its center at 270°) is 54° ahead of PAL #5 (having its center at 324°), but 18° later than PAL #4 (having its center at 252°); and
F. NTSC #6 (having its center at 330°) is 66° ahead of PAL #1b (having its center at 396° (36° in the next sequence)), but 6° later than PAL #5 (having its center at 324°).

The centers of each frame also may be analyzed from the PAL "perspective". For example, PAL Frame #2 (having its center at 108°) is 18° "later" in time compared to NTSC Frame #2 (having its center at 90°), but 42° ahead in time compared to PAL Frame #3 (having its center at 150°). All of the frames from the PAL system can be analyzed in this manner as follows:

A. PAL #1 (having its center at 36°) is 6° later than NTSC #1 (having its center at 30°), but 54° ahead of NTSC #2 (having its center at 90°);
B. PAL #2 (having its center at 108°) is 18° later than NTSC #2 (having its center at 90°), but 42° ahead of NTSC #3 (having its center at 150°);
C. PAL #3 (having its center at 180°) is 30° later than NTSC #3 (having its center at 150°), but 30° ahead of NTSC #4 (having its center at 210°);
D. PAL #4 (having its center at 252°) is 42° later than NTSC #4 (having its center at 210°), but 18° ahead of NTSC #5 (having its center at 270°); and
E. PAL #5 (having a center at 324°) is 54° later than NTSC #5 (having its center at 270°) but 6° ahead of NTSC #6 (having its center at 330°).

To indicate the degree of time coincidences between corresponding frames in percent, the above values have to be normalized, i.e., to be brought into relation to the angular interval represented by one frame of the original frame system. In the case of the conversion of PAL to NTSC, the time differences of corresponding frames have to be divided by 72. In the reverse way, the divisor is 60. From this, the following values result:

NTSC from PAL:
A. NTSC #1 is 8.3% ahead of PAL #1, but 91.7% later than PAL #5a;
B. NTSC #2 is 25% ahead of PAL #2, but 75% later than PAL #1;
C. NTSC #3 is 41.7% ahead of PAL #3, but 58.3% later than PAL #2;
D. NTSC #4 is 58.3% ahead of PAL #4, but 41.7% later than PAL #3;
E. NTSC #5 is 75% ahead of PAL #5, but 25% later than PAL #4; and
F. NTSC #6 is 91.7% ahead of PAL #1b, but 8.3% later than PAL #5.

PAL from NTSC:
A. PAL #1 is 10% later than NTSC #1, but 90% ahead of NTSC #2;
B. PAL #2 is 30% later than NTSC #2, but 70% ahead of NTSC #3;
C. PAL #3 is 50% later than NTSC #3, but 50% ahead of NTSC #4;
D. PAL #4 is 70% later than NTSC #4, but 30% ahead of NTSC #5; and
E. PAL #5 is 90% later than NTSC #5, but 10% ahead of NTSC #6.

These data indicate to what extent two frames of the source frame system in their time properties differ from that frame of the target frame system in the synthesis of which they proportionally contribute. It can easily be seen that a smaller difference of the representative time between the source frame and the newly synthesized frame results in a higher weight of the former. Analogously a great difference results in a corresponding lower weight. Therefore, the weighing coefficient of a frame is given as a complementary value of the percentage of the time shift between the source frame and the target frame to 100%. Therefore, for the evaluation of the weighing coefficients, the above equation can be given in which as input values only the time centers of both source frames (j, j+1) and the target frame (i) are needed.

The final values (in percentages) for every frame of the sequence for the transfer of materials between NTSC and PAL are as follows:

NTSC from PAL:
A. NTSC #1 is constructed from 91.7% of PAL #1 and from 8.3% of PAL #5a;
B. NTSC #2 is constructed from 75% of PAL #2 and from 25% of PAL #1;
C. NTSC #3 is constructed from 58.3% of PAL #3 and from 41.7% of PAL #2;
D. NTSC #4 is constructed from 41.7% of PAL #4 and from 58.3% of PAL #3;
E. NTSC #5 is constructed from 25% of PAL #5 and from 75% of PAL #4; and
F. NTSC #6 is constructed from 8.3% of PAL #1b and from 91.7% of PAL #5.

PAL from NTSC:
A. PAL #1 is constructed from 90% of NTSC #1 and from 10% of NTSC #2;
B. PAL #2 is constructed from 70% of NTSC #2 and from 30% of NTSC #3;
C. PAL #3 is constructed from 50% of NTSC #3 and from 50% of NTSC #4;
D. PAL #4 is constructed from 30% of NTSC #4 and from 70% of NTSC #5; and
E. PAL #5 is constructed from 10% of NTSC #5 and from 90% of NTSC #6.

These percentages relate to the super-imposed wedge diagrams shown in FIG. 5.

Film system transfer processes based on this invention will not cause a jitter effect, and every frame of the new frame system will represent the correct time. Using the same mathematical principles described above, there are equations for transferring frames between the following film systems: from NTSC to PAL (as discussed above); from PAL to NTSC (as discussed above); from Film16 to NTSC; from NTSC to Film 16; from Film 24 to NTSC; from NTSC to Film 24; from Film 16 to Film 24; from Film 24 to Film 16; from Film 16 to Film 60; from Film 60 to Film 16; from Film 24 to Film 60; from Film 60 to Film 24; from PAL to Film 24; from Film 24 to PAL; from Film 16 to PAL; from PAL to Film 16; from PAL to Film 60; from Film 60 to PAL; from NTSC to Film 60; and from Film 60 to NTSC. It is readily apparent that one skilled in the art could develop similar transfer processes for other film systems based on the principles described above including transformations between computer graphics sequences produced in different frame rates. The transfer process for the above-mentioned film systems will be described in more detail below in analogy to the NTSC-PAL transfer.

Figure 6:
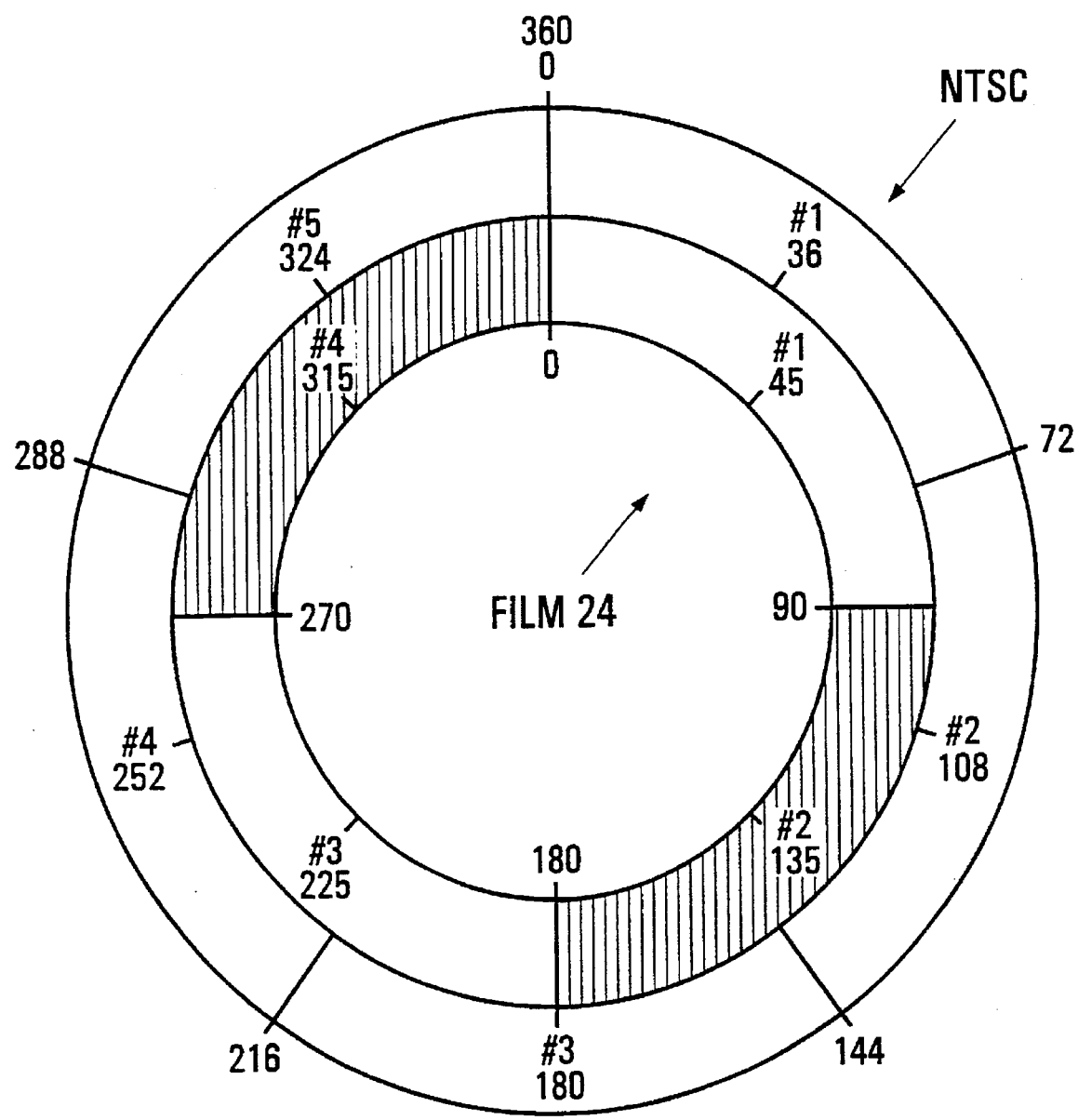
FIG. 6 is a rotating wedge diagram showing the NTSC and FILM 24 frame systems and the timing relationship therebetween.

Transfers may be made between Film 24 and NTSC. A rotating wedge representation of the sequence for the transfer between Film 24 and NTSC is shown in FIG. 6. The duration of the sequence is 0.0833 seconds. There are 5 frames of NTSC inside the sequence and 4 frames of Film 24 (including two image frames and two black frames) inside the sequence.

The data for NTSC in this sequence is as follows:
A. Frame #1=from 0° to 72° with the center at 36°;
B. Frame #2=from 72° to 144° with the center at 108°;
C. Frame #3=from 144° to 216° with the center at180°;
D. Frame #4=from 216° to 288° with the center at 252°; and
E. Frame #5=from 288° to 360° with the center at 324° (360°=0°).

The data for FILM 24 in this sequence is as follows (a=previous sequence, and b=next sequence):
A. Frame #3a=from 180° to 270° with the center at 225° (i.e., −135°; this is the last image frame of the previous sequence);
B. Frame #1=from 0° to 90° with the center at 45°;
C. Frame #2=from 90° to 180° with the center at 135° (a BLACK FRAME);
D. Frame #3=from 180° to 270° with the center at 225°;
E. Frame #4=from 270° to 360° with the center at 315°) (360°=0°) (a BLACK FRAME ); and
F. Frame #1b=from 0° to 90° with the center at 45° (the first image frame of the next sequence).

From FIG. 6, the following relationship between NTSC and FILM 24 (in the following written "FILM") can be seen:
NTSC from FILM 24 (in degrees):
A. NTSC #1 is 9° ahead of FILM #1, but 171° later than FILM #3a;
B. NTSC #2 is 117° ahead of FILM #3, but 63° later than FILM #1;
C. NTSC #3 is 45° ahead of FILM #3, but 135° later than FILM #1;
D. NTSC #4 is 153° ahead of FILM #1b, but 27° later than FILM #3; and
E. NTSC #5 is 81° ahead of FILM #1b, but 99° later than FILM #3.
FILM 24 from NTSC (in degrees):
A. FILM #1 is 9° later than NTSC #1, but 63° ahead of NTSC #2;
B. FILM #2 should be a BLACK FRAME;
C. FILM #3 is 45° later than NTSC #3, but 27° ahead of NTSC #4; and
D. FILM #4 should be a BLACK FRAME (NTSC #5 is not needed).

Converting the degree representations to percentages "ahead" and "later" provides the following values:
NTSC from FILM 24
A. NTSC #1 is 5% ahead of FILM #1, but 95% later than FILM #3a;
B. NTSC #2 is 65% ahead of FILM #3, but 35% later than FILM #1;
C. NTSC #3 is 25% ahead of FILM #3, but 75% later than FILM #1;
D. NTSC #4 is 85% ahead of FILM #1b, but 15% later than FILM #3; and
E. NTSC #5 is 45% ahead of FILM #1b, but 55% later than FILM #3.
FILM 24 from NTSC
A. FILM #1 is 12.5% later than NTSC #1, but 87.5% ahead of NTSC #2;
B. FILM #2 should be a BLACK FRAME;
C. FILM #3 is 62.5% later than NTSC #3, but 37.5% ahead of NTSC #4; and
D. FILM #4 should be a BLACK FRAME (NTSC #5 is not needed).

Based on these percentages, the final value for every frame of the sequence for the transfer of materials between NTSC and FILM 24 are as follows:
NTSC from FILM 24 (in percentages):
A. NTSC #1 is constructed from 95% of FILM #1 and from 5% of FILM #3a;
B. NTSC #2 is constructed from 35% of FILM #3 and from 65% of FILM #1;
C. NTSC #3 is constructed from 75% of FILM #3 and from 25% of FILM #1;
D. NTSC #4 is constructed from 15% of FILM #1b and from 85% of FILM #3; and
E. NTSC #5 is constructed from 55% of FILM #1b and from 45% of FILM #3.
FILM 24 from NTSC (in percentages):
A. FILM #1 is constructed from 87.5% of NTSC #1 and from 12.5% of NTSC #2;
B. FILM #2 should be a BLACK FRAME;
C. FILM #3 is constructed from 37.5% of NTSC #3 and from 62.5% of NTSC #4; and
D. FILM #4 should be a BLACK FRAME (NTSC #5 is not needed).

Figure 7:
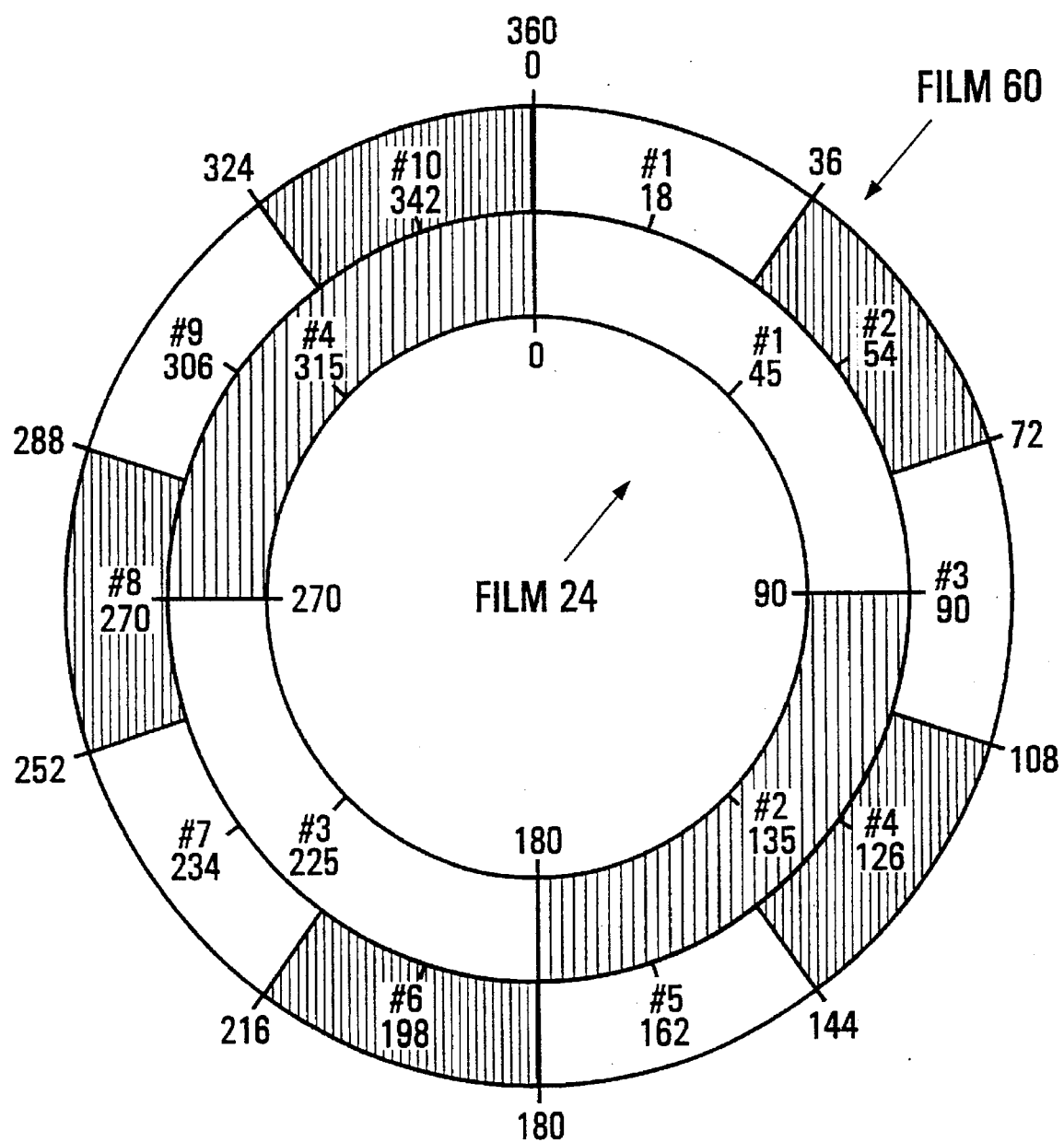
FIG. 7 is a rotating wedge diagram showing the FILM 60 and FILM 24 frame systems and the timing relationship therebetween.

The superimposed rotating wedge charts for image transfer between FILM 60 and FILM 24 are shown in FIG. 7. The duration of the sequence is 0.0833 seconds. There are 4 frames of FILM 24 (including two image frames and two black frames) inside the sequence and 10 frames of FILM 60 (including five image frames and five black frames) inside the sequence.

Here again, the above-mentioned exceptional rule applies: although a smaller basic frame sequence combination comprising 2 frames of Film 24 and 5 frames of Film 60 could be established, this would mean for Film 60 that two successive basic frame sequences would comprise a different number of exposed frames. Since this would result in different frame correlations, the frame numbers for both systems are doubled.

The data for FILM 60 in this sequence is as follows:
A. Frame #1=from 0° to 36° with the center at 18°;
B. Frame #2=from 36° to 72° with the center at 54° (BLACK FRAME);
C. Frame #3=from 72° to 108° with the center at 90°;
D. Frame #4=from 108° to 144° with the center at 126° (BLACK FRAME);

E. Frame #5=from 144° to 180° with the center at 162°;
F. Frame #6=from 180° to 216° with the center at 198° (BLACK FRAME);
G. Frame #7=from 216° to 252° with the center at 234°;
H. Frame #8=from 252° to 288° with the center at 270° (BLACK FRAME);
I. Frame #9=from 288° to 324° with the center at 306°; and
J. Frame #10=from 324° to 360° with the center at 342° (360°=0°)(BLACK FRAME).

The data for FILM 24 in this sequence is as follows (a=previous sequence, and b=next sequence):
A. Frame #3a=from 180° to 270° with the center at 225° (−135°; the last image frame of the previous sequence);
B. Frame #1=from 0° to 90° with the center at 45°;
C. Frame #2=from 90° to 180° with the center at 135° (BLACK FRAME);
D. Frame #3=from 180° to 270° with the center at 225°;
E. Frame #4=from 270° to 360° with the center at 315°, (360°=0°) (BLACK FRAME); and
F. Frame #1b=from 0° to 90° with the center at 45° (the first image frame of the next sequence).

From FIG. 7, the following relationship between FILM 60 and FILM 24 can be seen:
FILM 60 from Film 24 (in degrees):
A. FILM60 #1 is 27° ahead of FILM24 #1, but 153° later than FILM24 #3a;
B. FILM60 #2 should be a BLACK FRAME;
C. FILM60 #3 is 135° ahead of FILM24 #3, but 45° later than FILM24 #1;
D. FILM60 #4 should be a BLACK FRAME;
E. FILM60 #5 is 63° ahead of FILM24 #3, but 117° later than FILM24 #1;
F. FILM60 #6 should be a BLACK FRAME;
G. FILM60 #7 is 171° ahead of FILM24 #1b, but 9° later than FILM24 #3;
H. FILM60 #8 should be a BLACK FRAME;
I. FILM60 #9 is 99° ahead of FILM24 #1b, but 81° later than FILM24 #3; and
J. FILM60 #10 should be a BLACK FRAME.
FILM 24 from FILM 60 (in degrees):
A. FILM24 #1 is 27° later than FILM60 #1, but 45° ahead of FILM60 #3;
B. FILM24 #2 should be a BLACK FRAME;
C. FILM24 #3 is 63° later than FILM60 #5, but 9° ahead of FILM60 #7; and
D. FILM24 #4 should be a BLACK FRAME (FILM60 #9 is not needed).

Converting these degree amounts to percentages provides the following results:
FILM 60 from FILM 24:
A. FILM60 #1 is 15% ahead of FILM24 #1, but 85% later than FILM24 #3a;
B. FILM60 #2 should be a BLACK FRAME;
C. FILM60 #3 is 75% ahead of FILM24 #3, but 25% later than FILM24 #1;
D. FILM60 #4 should be a BLACK FRAME;
E. FILM60 #5 is 35% ahead of FILM24 #3, but 65% later than FILM24 #1;
F. FILM60 #6 should be a BLACK FRAME;
G. FILM60 #7 is 95% ahead of FILM24 #1b, but 5% later than FILM24 #3;
H. FILM60 #8 should be a BLACK FRAME;
I. FILM60 #9 is 55% ahead of FILM24 #1b, but 45% later than FILM24 #3; and
J. FILM60 #10 should be a BLACK FRAME.
FILM 24 from FILM 60:
A. FILM24 #1 is 37.5% later than FILM60 #1, but 62.5% ahead of FILM60 #3;
B. FILM24 #2 should be a BLACK FRAME;
C. FILM24 #3 is 87.5% later than FILM60 #5, but 12.5% ahead of FILM60 #7; and
D. FILM24 #4 should be a BLACK FRAME (FILM60 #9 is not needed).

The final percentage values for every frame of the sequence for the transfer of materials between FILM 60 and FILM 24 are as follows:
FILM 60 from FILM 24 (in percentages):
A. FILM60 #1 is constructed from 85% of FILM24 #1 and from 15% of FILM24 #3a;
B. FILM60 #2 is a BLACK FRAME;
C. FILM60 #3 is constructed from 25% of FILM24 #3 and from 75% of FILM24 #1;
D. FILM60 #4 is a BLACK FRAME;
E. FILM60 #5 is constructed from 65% of FILM24 #3 and from 35% of FILM24 #1;
F. FILM60 #6 is a BLACK FRAME;
G. FILM60 #7 is constructed from 5% of FILM24 #1b and from 95% of FILM24 #3;
H. FILM60 #8 is a BLACK FRAME;
I. FILM60 #9 is constructed from 45% of FILM24 #1b and from 55% of FILM24 #3; and
J. FILM60 #10 is a BLACK FRAME.
FILM 24 from FILM 60 (in percentages):
A. FILM24 #1 is constructed from 62.5% of FILM60 #1 and from 37.5% of FILM60 #3;
B. FILM24 #2 is a BLACK FRAME;
C. FILM24 #3 is constructed from 12.5% of FILM60 #5 and from 87.5% of FILM60 #7; and
D. FILM24 #4 is a BLACK FRAME (FILM60 #9 is not needed).

Figure 8:
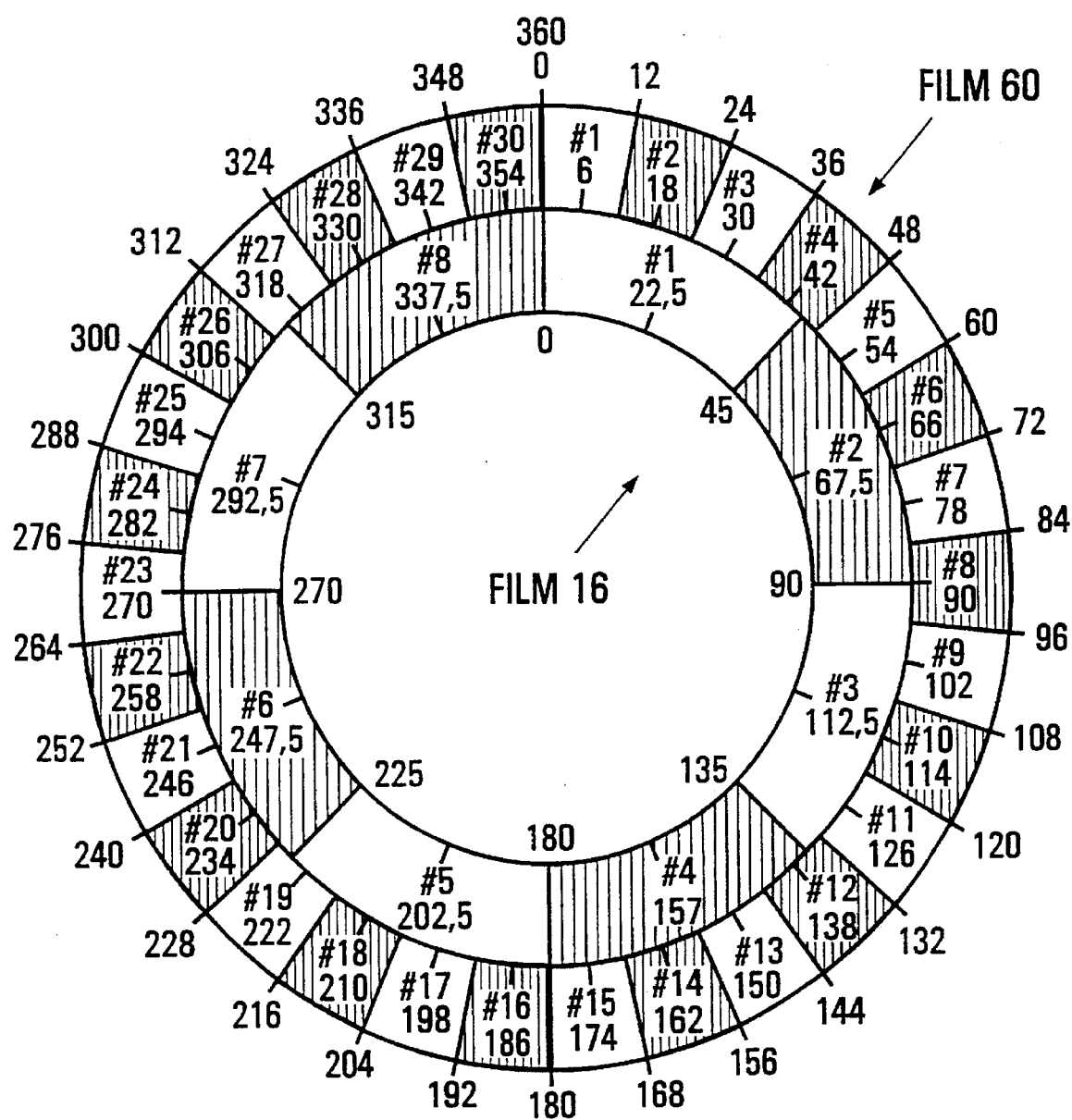
FIG. 8 is a rotating wedge diagram showing the FILM 60 and FILM 16 frame systems and the timing relationship therebetween.

FIG. 8 shows the superimposed rotating wedge chart for transferring images between FILM 16 and FILM 60. In this transfer, the duration of the sequence is 0.25 seconds. There are 8 frames of FILM 16 (including 4 image frames and 4 black frames) in this sequence and 30 frames of FILM 60 (including 15 image frames and 15 black frames) in the sequence.

Here again the rule applies that the number of frames of both basic frame sequences has to be doubled to obtain basic frame sequences of a constant number of actually exposed frames.

The final percentage values for every frame of the sequence for the transfer of materials between FILM 60 and FILM 16 are as follows:
FILM 60 from FILM 16 (in percentages):
A. FILM60 #1 is constructed from 81.7% of FILM16 #1 and from 18.3% of FILM16 #7a;
B. FILM60 #2 is a BLACK FRAME;
C. FILM60 #3 is constructed from 8.3% of FILM16 #3 and from 91.7% of FILM16 #1;
D. FILM60 #4 is a BLACK FRAME;
E. FILM60 #5 is constructed from 35% of FILM16 #3 and from 65% of FILM16 #1;
F. FILM60 #6 is a BLACK FRAME;
G. FILM60 #7 is constructed from 61.7% of FILM16 #3 and from 38.3% of FILM16 #1;
H. FILM60 #8 is a BLACK FRAME;
I. FILM60 #9 is constructed from 88.3% of FILM16 #3 and from 11.7% of FILM16 #1;
J. FILM60 #10 is a BLACK FRAME;
K. FILM60 #11 is constructed from 15% of FILM16 #5 and from 85% of FILM16 #3;
L. FILM60 #12 is a BLACK FRAME;
M. FILM60 #13 is constructed from 41.7% of FILM16 #5 and from 58.3% of FILM16 #3;

N. FILM60 #14 is a BLACK FRAME;
O. FILM60 #15 is constructed from 68.3% of FILM16 #5 and from 31.7% of FILM16 #3;
P. FILM60 #16 is a BLACK FRAME;
Q. FILM60 #17 is constructed from 95% of FILM16 #5 and from 5% of FILM16 #3;
R. FILM60 #18 is a BLACK FRAME;
S. FILM60 #19 is constructed from 21.7° of FILM16 #7 and from 78.3% of FILM16 #5;
T. FILM60 #20 is a BLACK FRAME;
U. FILM60 #21 is constructed from 48.3° of FILM16 #7 and from 51.7% of FILM16 #5;
V. FILM60 #22 is a BLACK FRAME;
W. FILM60 #23 is constructed from 75% of FILM16 #7 and from 25% of FILM16 #5;
X. FILM60 #24 is a BLACK FRAME;
Y. FILM60 #25 is constructed from 1.7% of FILM16 #1$b$ and from 98.3% of FILM16 #7;
Z. FILM60 #26 is a BLACK FRAME;
AA. FILM60 #27 is constructed from 28.5% of FILM16 #1$b$ and from 71.7% of FILM16 #7;
BB. FILM60 #28 is a BLACK FRAME;
CC. FILM60 #29 is constructed from 55% of FILM16 #1$b$ and from 45% of FILM16 #7; and
DD. FILM60 #30 is a BLACK FRAME.

FILM 16 from FILM 60 (in percentages):
A. FILM16 #1 is constructed from 31.25% of FILM60 #1 and from 68.75% of FILM60 #3;
B. FILM16 #2 is a BLACK FRAME (FILM60 #5 and FILM60 #7 are not needed);
C. FILM16 #3 is constructed from 56.25% of FILM60 #9 and from 43.75% of FILM60 #11;
D. FILM16 #4 is a BLACK FRAME (FILM60 #13 and FILM60 #15 are not needed);
E. FILM16 #5 is constructed from 81.25% of FILM60 #17 and from 18.75% of FILM60 #19;
F. FILM16 #6 is a BLACK FRAME (FILM60 #21 is not needed);
G. FILM16 #7 is constructed from 6.25% of FILM60 #23 and from 93.75% of FILM60 #25; and
H. FILM16 #8 is a BLACK FRAME (FILM60 #27 and FILM60 #29 are not needed).

From FIG. 8 it can be recognized that some frames of the Film 16 basic sequence are overlapped by three frames of the Film 60 basic sequence on the time scale (the "dial"), e.g., Film 16 #7 by Film 60 #23, #25 and #27. Here, as well as in similar cases, such as in the conversion of NTSC to Film 16 or PAL to Film 16, it is also within the scope of the invention to use more than two temporally neighboring frames of the original frame sequence to synthesize one frame of the new frame sequence, wherein the weighing factors are dependent on the distance of the frame interval centers of the used frames to the center of the frame to be produced, as well. An apparatus to realize this (cf. the description with respect to FIGS. 16 and 17 below) is designed such that the image contents of three or more original frames can be mixed to a new frame.

Figure 9:
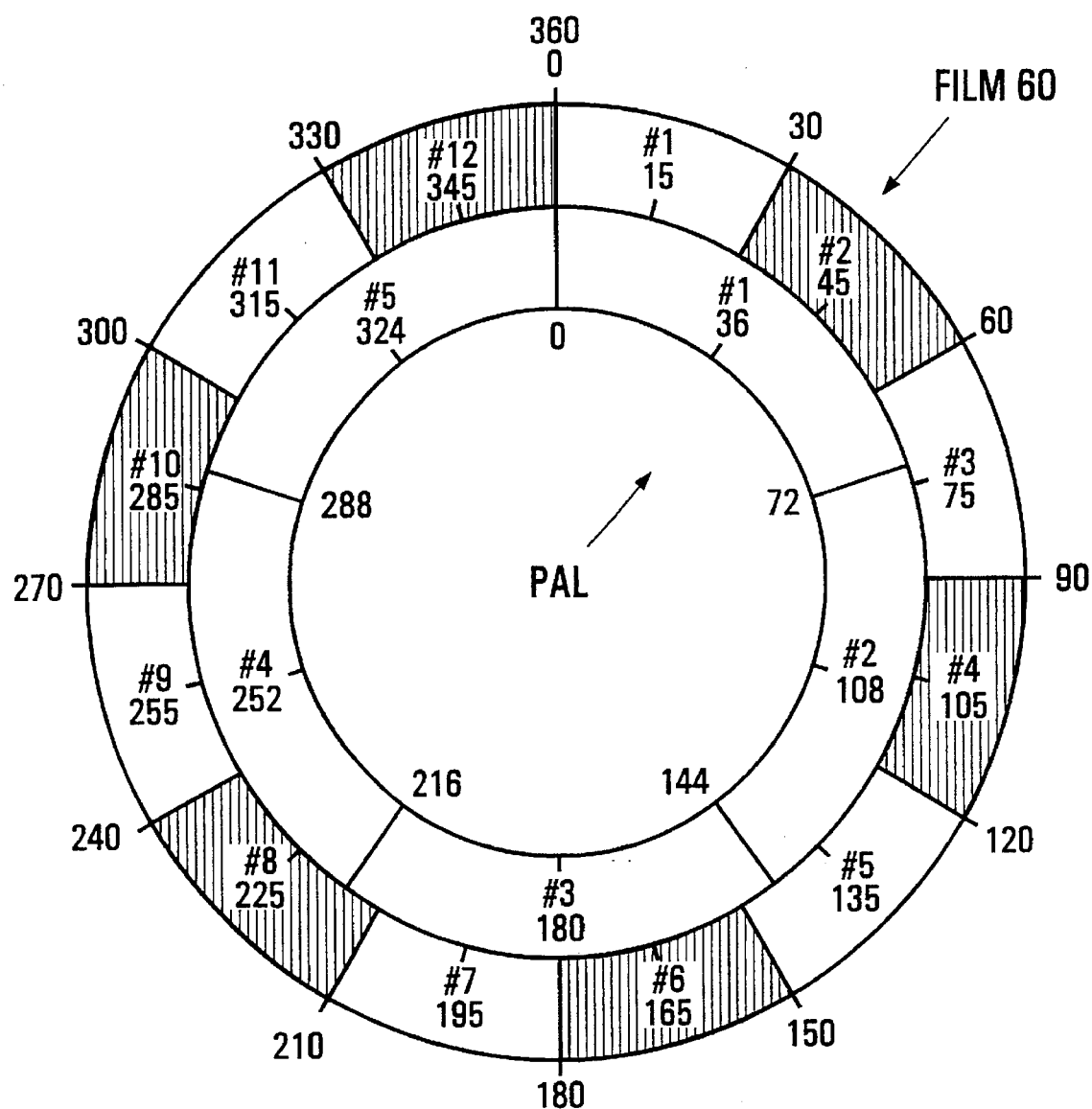
FIG. 9 is a rotating wedge diagram showing the FILM 60 and PAL frame systems and the timing relationship therebetween.

FIG. 9 shows the rotating wedge diagram for the image conversion between Film 60 ("showscan") and the PAL system. The duration of the sequence shown in FIG. 9 is 0.1 seconds. This corresponds to five frames of PAL in the sequence and twelve frames of Film 60 (including six image frames and six black frames) in the sequence. Here, the data for the time intervals and their centers being the basis for the evaluation of the frame specific weighing coefficients immediately can again be taken from the respective frame number per sequence, and the relations are illustrated in the FIGURE. From this, once again, the temporal relations between the frames of the original and the target frame sequences can be derived following the method being generally described and exemplified in the cases PAL-NTSC, NTSC-PAL and others.

The final values for constructing every frame of the sequence for the transfer of materials between PAL and FILM 60 are as follows:
FILM 60 from PAL:
A. FILM60 #1 is constructed from 70.8% of PAL #1 and from 29.2% of PAL #5$a$;
B. FILM60 #2 is a BLACK FRAME;
C. FILM60 #3 is constructed from 54.2% of PAL #2 and from 45.8% of PAL #1;
D. FILM60 #4 is a BLACK FRAME;
E. FILM60 #5 is constructed from 37.5% of PAL #3 and from 62.5% of PAL #2
F. FILM60 #6 is a BLACK FRAME;
G. FILM60 #7 is constructed from 20.8% of PAL #4 and from 79.2% of PAL #3;
H. FILM60 #8 is a BLACK FRAME;
I. FILM60 #9 is constructed from 4.2% of PAL #5 and from 95.8% of PAL #4;
J. FILM60 #10 is a BLACK FRAME;
K. FILM60 #11 is constructed from 87.5% of PAL #5 and from 12.5% of PAL #4; and
L. FILM60 #12 is a BLACK FRAME.

PAL from FILM 60:
A. PAL #1 is constructed from 65% of FILM60 #1 and from 35% of FILM60 #3;
B. PAL #2 is constructed from 45% of FILM60 #3 and from 55% of FILM60 #5;
C. PAL #3 is constructed from 25% of FILM60 #5 and from 75% of FILM60 #7;
D. PAL #4 is constructed from 5% of FILM60 #7 and from 95% of FILM60 #9; and
E. PAL #5 is constructed from 85% of FILM60 #11 and from 15% of FILM60 #1$b$.

Figure 10:
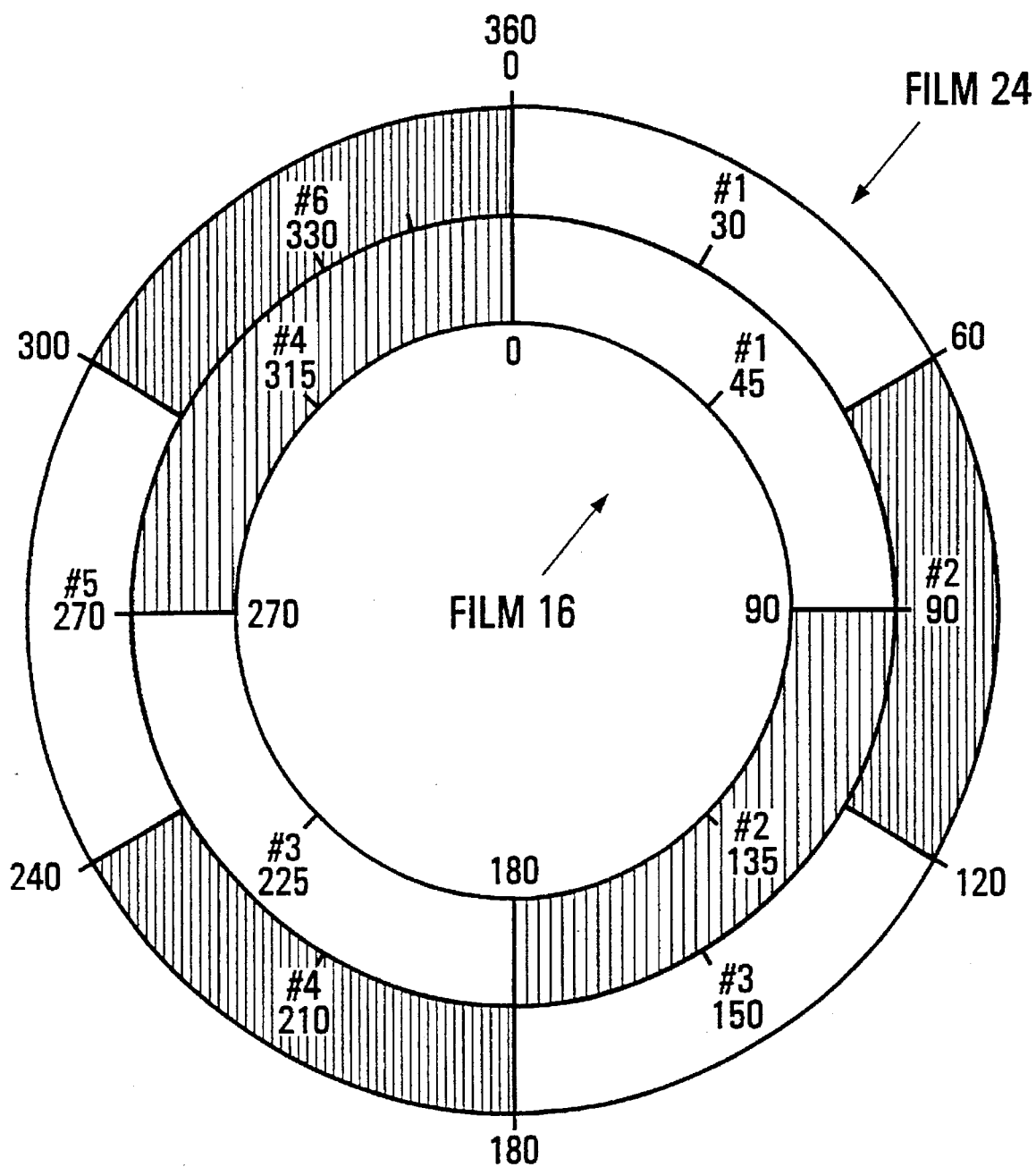
FIG. 10 is a rotating wedge diagram showing the FILM 24 and FILM 16 frame systems and the timing relationship therebetween.

FIG. 10 is the rotating wedge diagram for image transfers between the Film 24 and Film 16 frame systems. The duration of the sequence is 0.125 seconds. Six frames of FILM 24 (including 3 image frames and 3 black frames) are inside the sequence, and four frames of FILM 16 (including 2 image frames and 2 black frames) are inside the sequence.

The time intervals and centers thereof being relevant for the transfer once again result from the frame number per frame sequence and can be derived from FIG. 10. It follows from this that for the construction of the several frames of the respective frame sequences in the transfer between Film 24 and Film 16, the following numeral rules are valid:
FILM 24 from FILM 16:
A. FILM24 #1 is constructed from 91.7% of FILM16 #1 and from 8.3% of FILM16 #3$a$;
B. FILM24 #2 is a BLACK FRAME;
C. FILM24 #3 is constructed from 58.3% of FILM16 #3 and from 41.7% of FILM16 #1;
D. FILM24 #4 is a BLACK FRAME;
E. FILM24 #5 is constructed from 25% of FILM16 #1$b$ and from 75% of FILM16 #3; and
F. FILM24 #6 is a BLACK FRAME.

FILM16 from FILM 24:
A. FILM16 #1 is constructed from 87.5% of FILM24 #1 and from 12.5% of FILM24 #3;
B. FILM16 #2 is a BLACK FRAME;
C. FILM16 #3 is constructed from 37.5% of FILM24 #3 and from 62.5% of FILM24 #5; and
D. FILM16 #4 is a BLACK FRAME.

Figure 11:
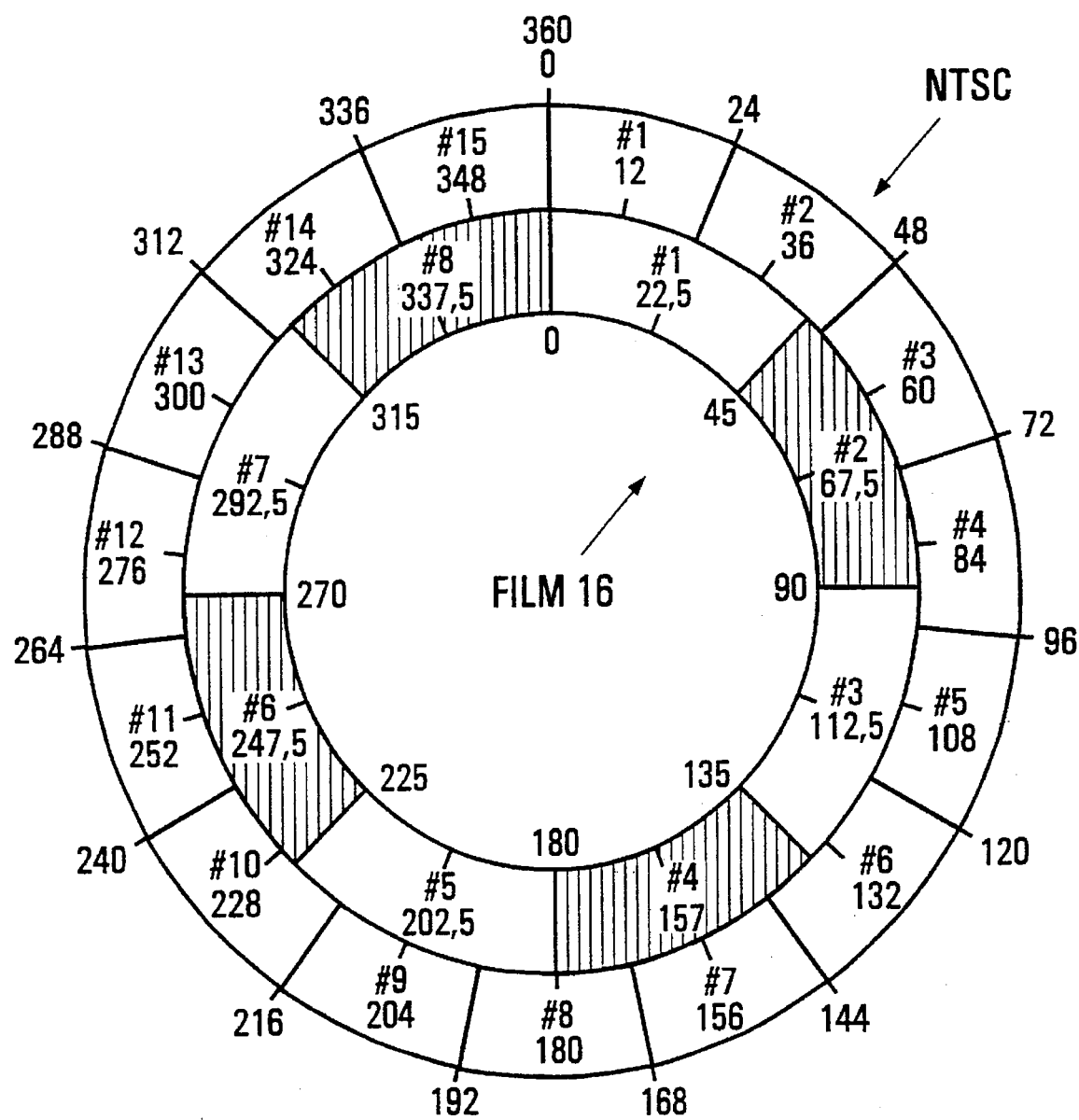
FIG. 11 is a rotating wedge diagram showing the NTSC and FILM 16 frame systems and the timing relationship therebetween.

FIG. 11 shows the rotating wedge diagram for converting images between the NTSC and FILM 16 frame systems. The duration of the sequence is 0.25 seconds. There are 15 frames of NTSC inside the sequence, and 8 frames of FILM 16 (including 4 image frames and 4 black frames) inside the sequence.

The frame intervals on the time axis (being circle-shaped here as well as in all rotating wedge diagrams), the location of the centers thereof, and the temporal relations between the latter ones, once again immediately result from the frame number per frame sequence and can be taken from the figure.

From this, the rules for the construction of the several frames of the frame sequences for the transfer between NTSC and Film 16 can be derived according to the above-mentioned general rule and in analogy to the extensively explained examples as follows:

NTSC from FILM 16:

A. NTSC #1 is constructed from 88.3% of FILM16 #1 and 11.7% of FILM16 #7a;
B. NTSC #2 is constructed from 15% of FILM16 #3 and 85% of FILM16 #1;
C. NTSC #3 is constructed from 41.7% of FILM16 #3 and 58.3% of FILM16 #1;
D. NTSC #4 is constructed from 68.3% of FILM16 #3 and 31.7% of FILM16 #1;
E. NTSC #5 is constructed from 95% of FILM16 #3 and 5% of FILM16 #1;
F. NTSC #6 is constructed from 21.7% of FILM16 #5 and 78.3% of FILM 16 #3;
G. NTSC #7 is constructed from 48.3% of FILM16 #5 and 51.7% of FILM16 #3;
H. NTSC #8 is constructed from 75% of FILM16 #5 and 25% of FILM16 #3;
I. NTSC #9 is constructed from 1.7% of FILM16 #7 and 98.3% of FILM16 #5;
J. NTSC #10 is constructed from 28.3% of FILM16 #7 and 71.7% of FILM16 #5;
K. NTSC #11 is constructed from 55% of FILM16 #7 and 45% of FILM16 #5;
L. NTSC #12 is constructed from 81.7% of FILM16 #7 and 18.3% of FILM16 #5;
M. NTSC #13 is constructed from 8.3% of FILM16 #1b and 91.7% of FILM16 #7;
N. NTSC #14 is constructed from 35% of FILM16 #1b and 65% of FILM16 #7; and
O. NTSC #15 is constructed from 61.7% of FILM 16 #1b and 38.3% of FILM 16 #7.

FILM 16 from NTSC:

A. FILM16 #1 is constructed from 56.25% of NTSC #1 and from 43.75% of NTSC #2;
B. FILM16 #2 is a BLACK FRAME (NTSC #3 and NTSC #4 are not needed);
C. FILM16 #3 is constructed from 81.25% of NTSC #5 and from 18.75% of NTSC #6;
D. FILM16 #4 is a BLACK FRAME (NTSC #7 is not needed);
E. FILM16 #5 is constructed from 6.25% of NTSC #8 and from 93.75% of NTSC #9;
F. FILM16 #6 is a BLACK FRAME (NTSC #10 and NTSC #11 are not needed);
G. FILM16 #7 is constructed from 31.25% of NTSC #12 and from 68.75% of NTSC #13; and
H. FILM16 #8 is a BLACK FRAME (NTSC #14 and NTSC #15 are not needed).

Figure 12:
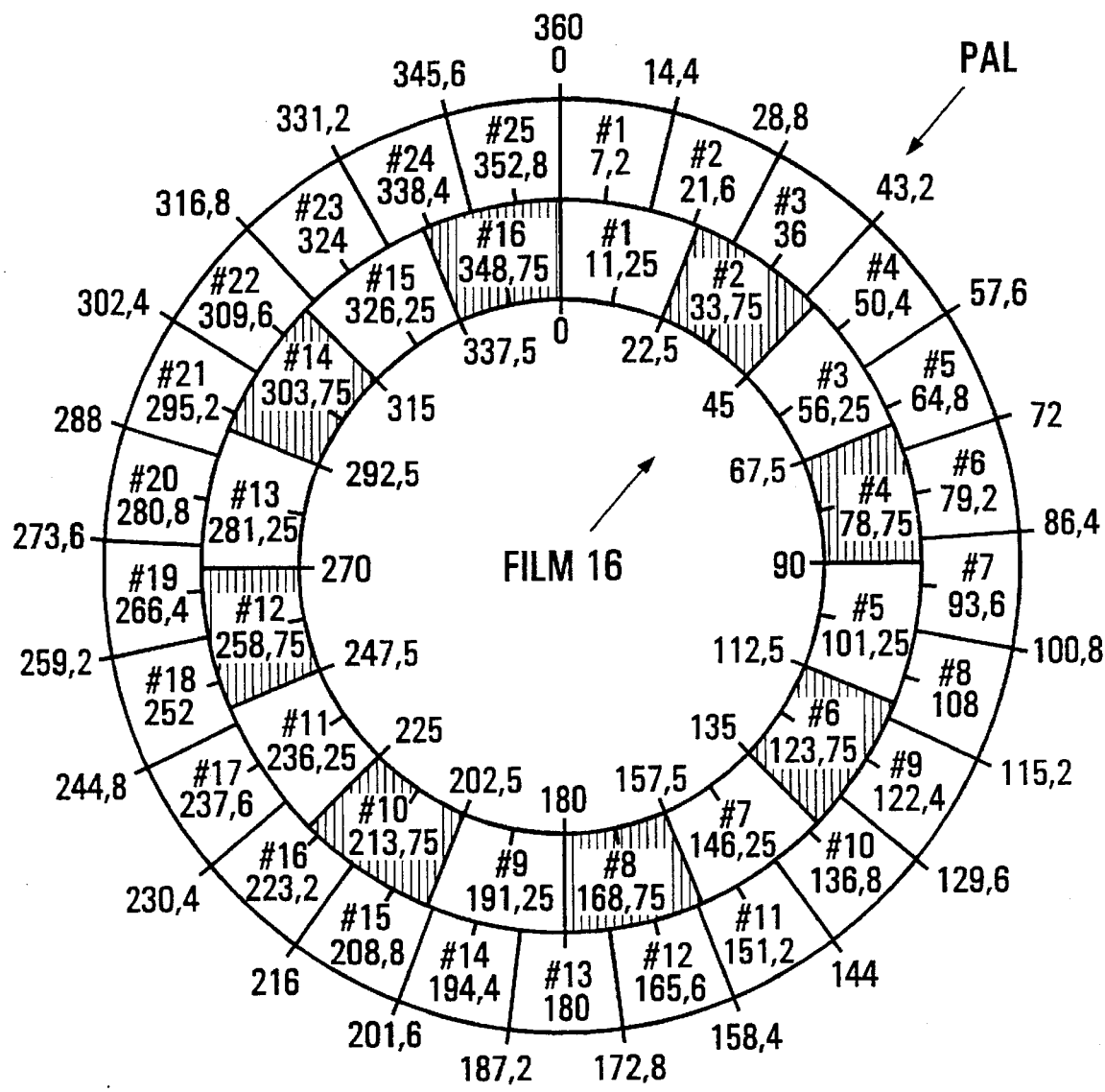
FIG. 12 is a rotating wedge diagram showing the PAL and FILM 16 frame systems and the timing relationship therebetween.

The rotating wedge chart for conversion between PAL and FILM 16 is shown in FIG. 12. The duration of the sequence is 0.5 seconds. There are 25 frames of PAL inside the sequence, and 16 frames of FILM 16 (including 8 image frames and 8 black frames) inside the sequence.

The data of the frame intervals and the centers thereof, as well as of the temporal relations between them, for the frame sequences in both systems once again can be derived from the frame number per sequence in the above explained way (wherein in the graphical representation, a full sequence always corresponds to 360° and can be taken from the figure).

The construction rules for each frame of the respective basic frame sequence for the conversion between PAL and Film 16 then are as follows:

PAL from FILM 16

A. PAL #1 is constructed from 91% of FILM16 #1 and from 9% of FILM 16 #15a;
B. PAL #2 is constructed from 23% of FILM16 #3 and from 77% of FILM16 #1;
C. PAL #3 is constructed from 55% of FILM16 #3 and from 45% of FILM16 #1;
D. PAL #4 is constructed from 87% of FILM 16 #3 and from 13% of FILM16 #1;
E. PAL #5 is constructed from 19% of FILM16 #5 and from 81% of FILM16 #3;
F. PAL #6 is constructed from 51% of FILM16 #5 and from 49% of FILM16 #3;
G. PAL #7 is constructed from 83% of FILM16 #5 and from 17% of FILM16 #3;
H. PAL #8 is constructed from 15% of FILM16 #7 and from 85% of FILM16 #5;
I. PAL #9 is constructed from 47% of FILM16 #7 and from 53% of FILM16 #5;
J. PAL #10 is constructed from 79% of FILM16 #7 and from 21% of FILM16 #5;
K. PAL #11 is constructed from 11% of FILM16 #9 and from 89% of FILM16 #7;
L. PAL #12 is constructed from 43% of FILM16 #9 and from 57% of FILM16 #7;
M. PAL #13 is constructed from 75% of FILM16 #9 and from 25% of FILM16 #7;
N. PAL #14 is constructed from 7% of FILM16 #11 and from 93% of FILM16 #9;
O. PAL #15 is constructed from 39% of FILM16 #11 and from 61% of FILM16 #9;
P. PAL #16 is constructed from 71% of FILM16 #11 and from 29% of FILM16 #9;
Q. PAL #17 is constructed from 3% of FILM16 #13 and from 97% of FILM16 #11;
R. PAL #18 is constructed from 35% of FILM16 #13 and from 65% of FILM16 #11;
S. PAL #19 is constructed from 67% of FILM16 #13 and from 33% of FILM16 #11;
T. PAL #20 is constructed from 99% of FILM16 #13 and from 1% of FILM16 #11;
U. PAL #21 is constructed from 31% of FILM16 #15 and from 69% of FILM16 #13;
V. PAL #22 is constructed from 63% of FILM16 #15 and from 37% of FILM16 #13;
W. PAL #23 is constructed from 95% of FILM16 #15 and from 5% of FILM16 #13;
X. PAL #24 is constructed from 27% of FILM16 #1b and from 73% of FILM16 #15; and
Y. PAL #25 is constructed from 59% of FILM16 #1b and from 41% of FILM16 #15.

FILM 16 from PAL

A. FILM16 #1 is constructed from 71.9% of PAL #1 and from 28.1% of PAL #2;

B. FILM16 #2 is a BLACK FRAME (PAL #3 is not needed);
C. FILM16 #3 is constructed from 59.4% of PAL #4 and from 40.6% of PAL #5;
D. FILM16 #4 is a BLACK FRAME (PAL #6 is not needed);
E. FILM16 #5 is constructed from 46.9% of PAL #7 and from 53.1% of PAL #8;
F. FILM16 #6 is a BLACK FRAME (PAL #9 is not needed);
G. FILM16 #7 is constructed from 34.4% of PAL #10 and from 65.6% of PAL #11;
H. FILM16 #8 is a BLACK FRAME (PAL #12 is not needed);
I. FILM16 #9 is constructed from 21.9% of PAL #13 and from 78.1% of PAL #14;
J. FILM16 #10 is a BLACK FRAME (PAL #15 is not needed);
K. FILM16 #11 is constructed from 9.4% of PAL #16 and from 90.6% of PAL #17;
L. FILM16 #12 is a BLACK FRAME (PAL #18 and PAL #19 are not needed);
M. FILM16 #13 is constructed from 96.9% of PAL #20 and from 3.1% of PAL #21;
N. FILM16 #14 is a BLACK FRAME (PAL #22 is not needed);
O. FILM16 #15 is constructed from 84.4% of PAL #23 and from 15.6% of PAL #24; and
P. FILM16 #16 is a BLACK FRAME (PAL #25 is not needed).

Figure 13:
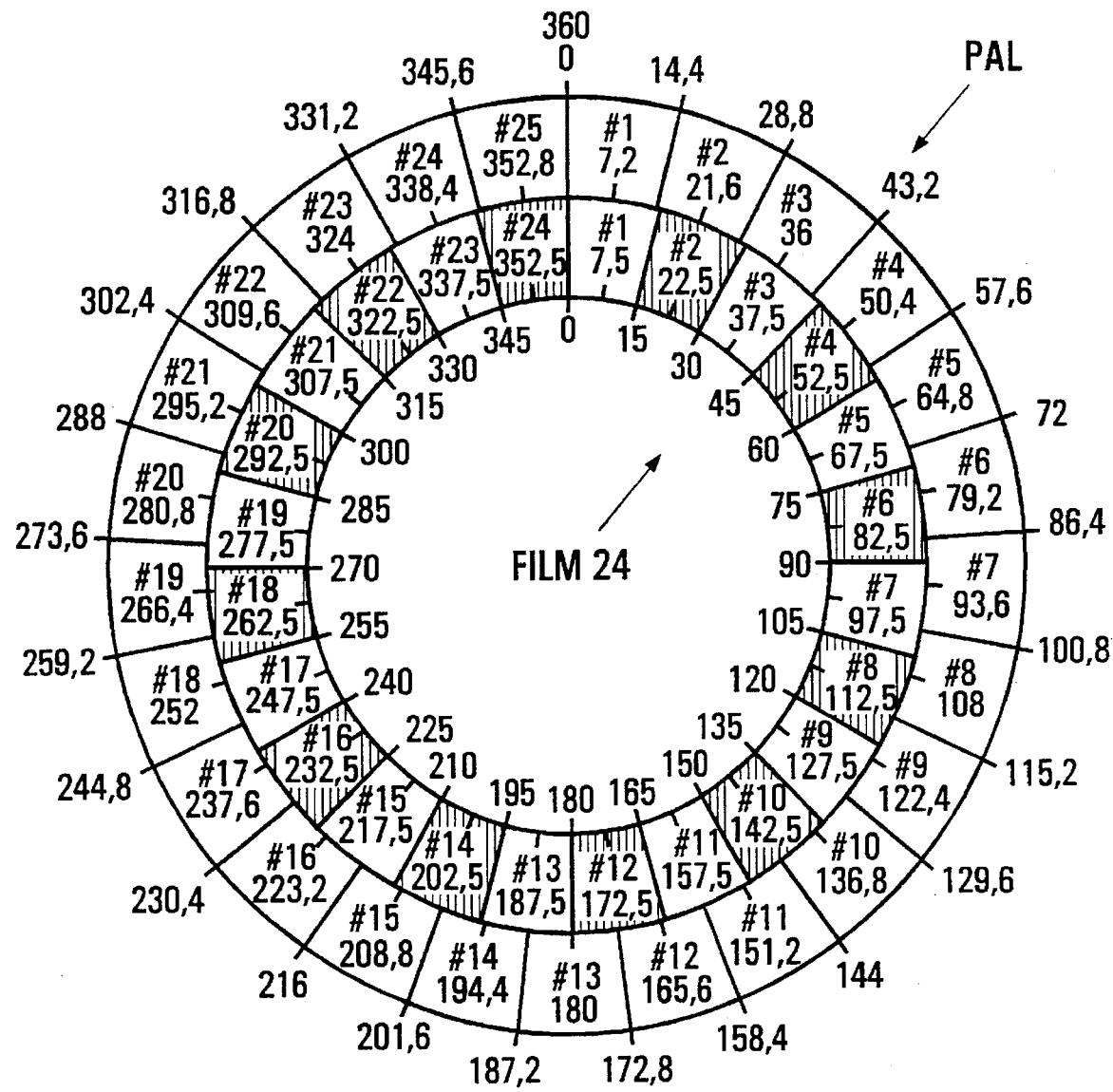
FIG. 13 is a rotating wedge diagram showing the PAL and FILM 24 frame systems and the timing relationship therebetween.

FIG. 13 shows the rotating wedge diagram for conversion between the PAL and FILM 24 frame systems. The duration of the sequence is 0.5 seconds. There are 25 frames of PAL inside the sequence and 24 frames of FILM 24 (including 12 image frames and 12 black frames).

The time intervals and corresponding centers thereof once again can be derived from the division of the frame sequences into the number of frames as mentioned, and from this (considering the graphical representation in FIG. 13, too), the temporal relations of all frames of a frame sequence to be produced with respect to the temporally neighboring or overlapping frames, respectively, of the original frame sequence can be determined.

The final rules for constructing the basic sequences for the transfer of materials between PAL and FILM 24 is as follows:

PAL from FILM 24 (in percentages)
A. PAL #1 is constructed from 99% of FILM24 #1 and from 1% of FILM24 #23a;
B. PAL #2 is constructed from 47% of FILM24 #3 and from 53% of FILM24 #1;
C. PAL #3 is constructed from 95% of FILM24 #3 and from 5% of FILM24 #1;
D. PAL #4 is constructed from 43% of FILM24 #5 and from 57% of FILM24 #3;
E. PAL #5 is constructed from 91% of FILM24 #5 and from 9% of FILM24 #3;
F. PAL #6 is constructed from 39% of FILM24 #7 and from 61% of FILM24 #5;
G. PAL #7 is constructed from 87% of FILM24 #7 and from 13% of FILM24 #5;
H. PAL #8 is constructed from 35% of FILM24 #9 and from 65% of FILM24 #7;
I. PAL #9 is constructed from 83% of FILM24 #9 and from 17% of FILM24 #7;
J. PAL #10 is constructed from 31% of FILM24 #11 and from 69% of FILM24 #9;
K. PAL #11 is constructed from 79% of FILM24 #11 and from 21% of FILM24 #9;
L. PAL #12 is constructed from 27% of FILM24 #13 and from 73% of FILM24 #11;
M. PAL #13 is constructed from 75% of FILM24 #13 and from 25% of FILM24 #11;
N. PAL #14 is constructed from 23% of FILM24 #15 and from 77% of FILM24 #13;
O. PAL #15 is constructed from 71% of FILM24 #15 and from 29% of FILM24 #13;
P. PAL #6 is constructed from 19% of FILM24 #17 and from 81% of FILM24 #15;
Q. PAL #17 is constructed from 67% of FILM24 #17 and from 33% of FILM24 #15;
R. PAL #18 is constructed from 15% of FILM24 #19 and from 85% of FILM24 #17;
S. PAL #19 is constructed from 63% of FILM24 #19 and from 37% of FILM24 #17;
T. PAL #20 is constructed from 11% of FILM24 #21 and from 89% of FILM24 #19;
U. PAL #21 is constructed from 59% of FILM24 #21 and from 41% of FILM24 #19;
V. PAL #22 is constructed from 7% of FILM24 #23 and from 93% of FILM24 #21;
W. PAL #23 is constructed from 55% of FILM24 #23 and from 45% of FILM24 #21;
X. PAL #24 is constructed from 3% of FILM24 #1b and from 97% of FILM24 #23; and
Y. PAL #25 is constructed from 51% of FILM24 #1b and from 49% of FILM24 #23.

FILM 24 from PAL (in percentages)
A. FILM24 #1 is constructed from 97.9% of PAL #1 and from 2.1% of PAL #2;
B. FILM24 #2 is a BLACK FRAME;
C. FILM24 #3 is constructed from 89.6% of PAL #3 and from 10.4% of PAL #4;
D. FILM24 #4 is a BLACK FRAME;
E. FILM24 #5 is constructed from 81.2% of PAL #5 and from 18.8% of PAL #6;
F. FILM24 #6 is a BLACK FRAME;
G. FILM24 #7 is constructed from 72.9% of PAL #7 and from 27.1% of PAL #8;
H. FILM24 #8 is a BLACK FRAME;
I. FILM24 #9 is constructed from 64.6% of PAL #9 and from 35.4% of PAL #10;
J. FILM24 #10 is a BLACK FRAME;
K. FILM24 #11 is constructed from 56.2% of PAL #11 and from 43.8% of PAL #12;
L. FILM24 #12 is a BLACK FRAME;
M. FILM24 #13 is constructed from 47.9% of PAL #13 and from 52.1% of PAL #14;
N. FILM24 #14 is a BLACK FRAME;
O. FILM24 #15 is constructed from 39.6% of PAL #15 and from 60.4% of PAL #16;
P. FILM24 #16 is a BLACK FRAME;
Q. FILM24 #17 is constructed from 31.2% of PAL #17 and from 68.8% of PAL #18;
R. FILM24 #18 is a BLACK FRAME;
S. FILM24 #19 is constructed from 22.9% of PAL #19 and from 77.1% of PAL #20;
T. FILM24 #20 is a BLACK FRAME;
U. FILM24 #21 is constructed from 14.6% of PAL #21 and from 85.4% of PAL #22;
V. FILM24 #22 is a BLACK FRAME;
W. FILM24 #23 is constructed from 6.2% of PAL #23 and from 93.8% of PAL #24; and
X. FILM24 #24 is a BLACK FRAME (PAL #25 is not needed).

NTSC—FILM 60

Figure 14:
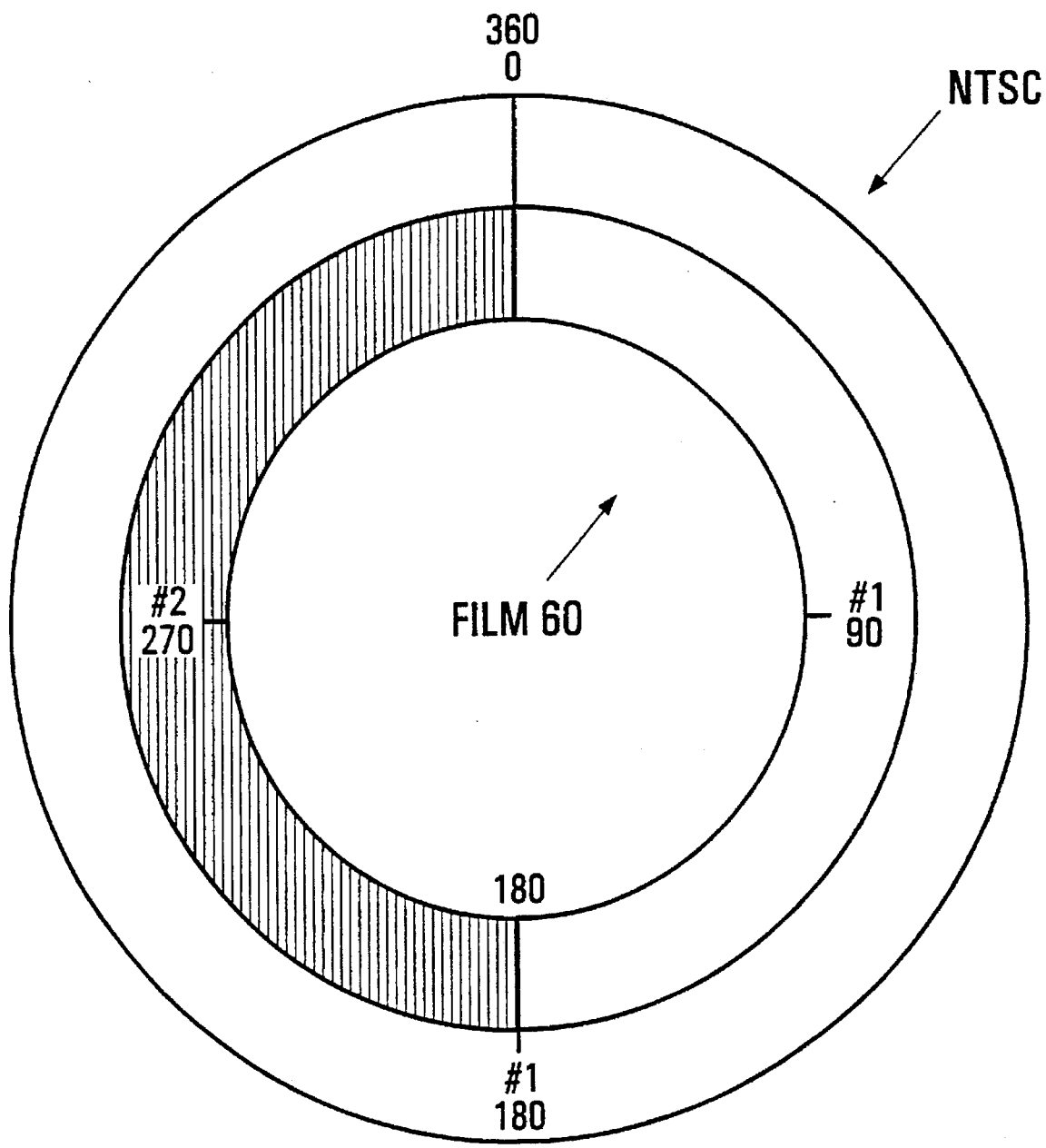
FIG. 14 is a rotating wedge diagram showing the NTSC and FILM 60 frame systems and the timing relationship therebetween.

FIG. 14 shows the combined rotating wedge diagram for the conversion between the NTSC and the Film 60 frame systems. The basic frame sequences for NTSC comprise 1 frame (field) and for Film 60 2 frames, wherein in the latter basic frame sequence an actually exposed and a "black" frame alternate, respectively. The length of the frame intervals, the location of their centers and the time relations of the frames of both basic frame sequences to each other again immediately result from the combination of the frame numbers of the basic frame sequences and easily can be recognized in FIG. 14. From there, the rules for the construction of the several frames of the corresponding target sequence from the corresponding source sequence can be derived as follows:

NTSC from FILM 60

NTSC #1 is constructed from 75.0% of FILM60 #1 and from 25% of FILM60 #1b.

Film 60 from NTSC

A. FILM60 #1 is constructed from 75% of NTSC #1 and from 25% of NTSC #1a; and

B. FILM60 #2 is a Black Frame.

Figure 15:
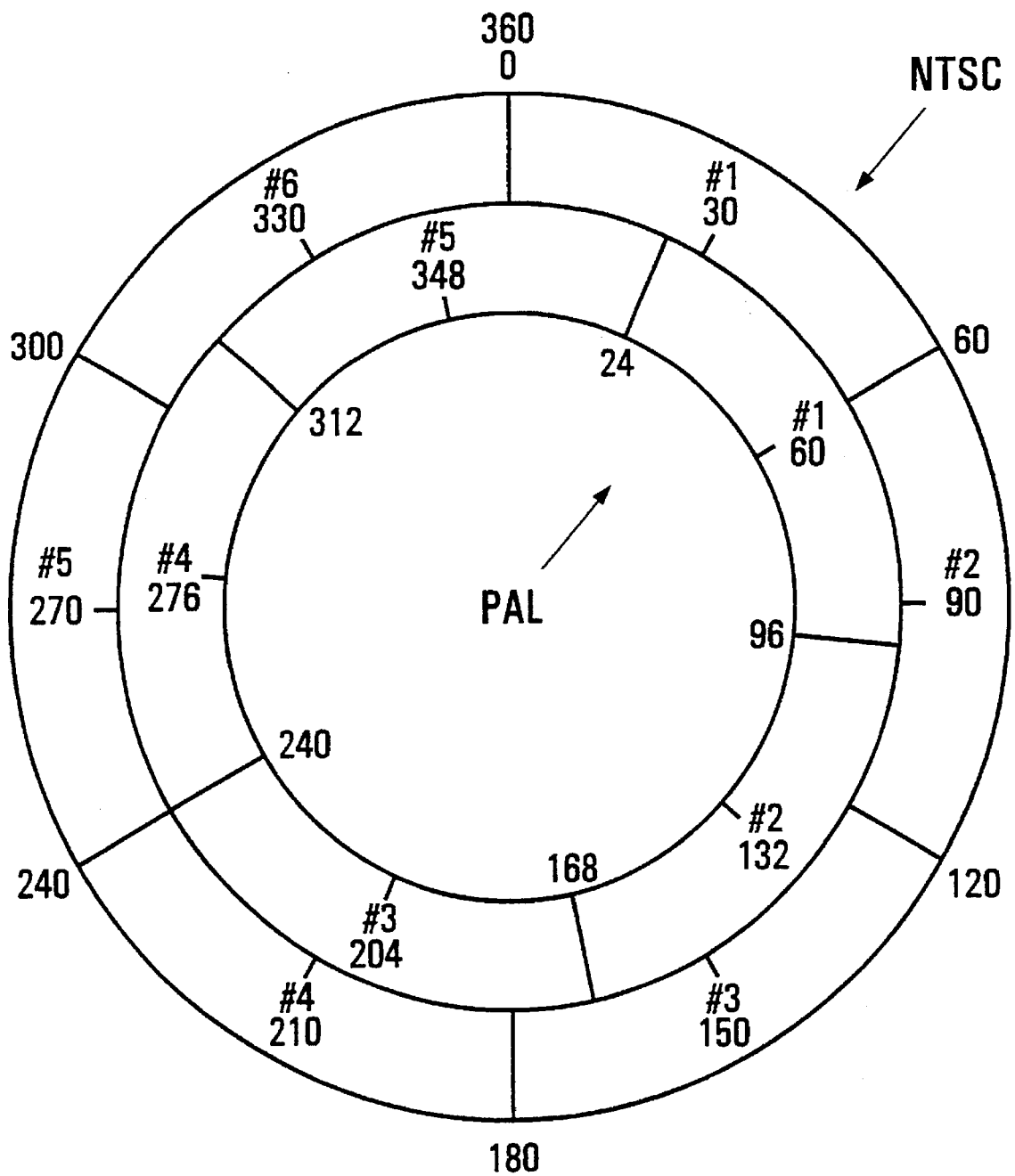
FIG. 15 is a rotating wedge diagram showing the NTSC and PAL frame systems and a timing relationship therebetween which is altered by means of an offset of the start times.

Since in the combined rotating wedge diagrams being the basis of the above calculations, both basic frame sequences are started synchronously, a special case of their relative assignment has been considered. Although preferably this case should be realized, since only here the synchronity of the film start prior to and after the conversion is guaranteed, it should also be possible to start from a slightly altered relative assignment of the basic frame sequences, e.g., to achieve some other kind of optimization for a distinct conversion. The offset of both basic frame sequences arising in such case results in new frame centers and therefore in amended weighing coefficients. (The interdependence between the first frame of a target basic frame sequence and the corresponding frames of the source frame sequence—determined on the basis of synchronously started frame sequences—may, however, not be changed.) The above equation for the evaluation of the weighing coefficients can be used unamended if the frame centers being used in this equation are determined by means of a combined rotating wedge diagram which takes the offset between both frame sequences into account. In FIG. 15, such a diagram for the conversion NTSC-PAL is shown. Alternatively, the above determined frame centers can remain unamended, but the weighing coefficients have to be evaluated by means of an amended equation taking the offset into account:

$$C_{j,s}=1-|t_j-(t_j+d)|/(t_{j+1}-t_j)$$

$$C_{j+1,s}=1-|t_{j+1}-(t_j+d)|/(t_{j+1}-t_j)$$

wherein d is the offset.

Herein the offset d is defined as the shift of the start point of the basic frame sequence of the target system with respect to that of the source system. A positive sign describes a clockwise offset. In FIG. 15, therefore, the offset of the PAL basic frame sequence with respect to the NTSC basic frame sequence is 24°. Such offset may not lead to the sequence that for the first frame of the basic frame sequence to be produced, the interdependence to the frames of the source frame sequence is changed. That is why a shift of the frame center of the first frame of the target system can only be carried out within the region being defined by the frame centers of the two temporally corresponding frames of the source system. In the conversion correlation shown in FIG. 15, therefore, the offset is restricted to an interval of −6° to 54°.

The images in the original frame system are transferred to the new frame system in the proportions described above.

The images in the new frame system can be built using digital processing. The transfer between frame systems may include two steps: the preparation of the transferred image and the actual image transfer.

The preparation of material to be transferred is a reconstruction of missing visual information in the material. In interlaced video, because every video frame includes an interlaced image, it is necessary, before transfer, to reconstruct part of the missing image in black lines. There are methods of reconstructing the missing image which are applied in the "freeze frame" effect from one video field (a video field is also called a video frame in this application).

For the image transfer step, there are at least two methods of transfer: one method is a "double exposure" method. When transferring from a film frame system to another film frame system, two consecutive film frames from the original frame system are exposed with an optical printer using different exposures (time or density—according to the above described weighing factors) on one film frame of the new frame system.

When transferring from a video frame system to another video frame system, two consecutive reconstructed video frames from the original video frame system are electronically mixed with different levels of signals (according to the above described calculations) to one frame on the new video frame system.

Figure 16:
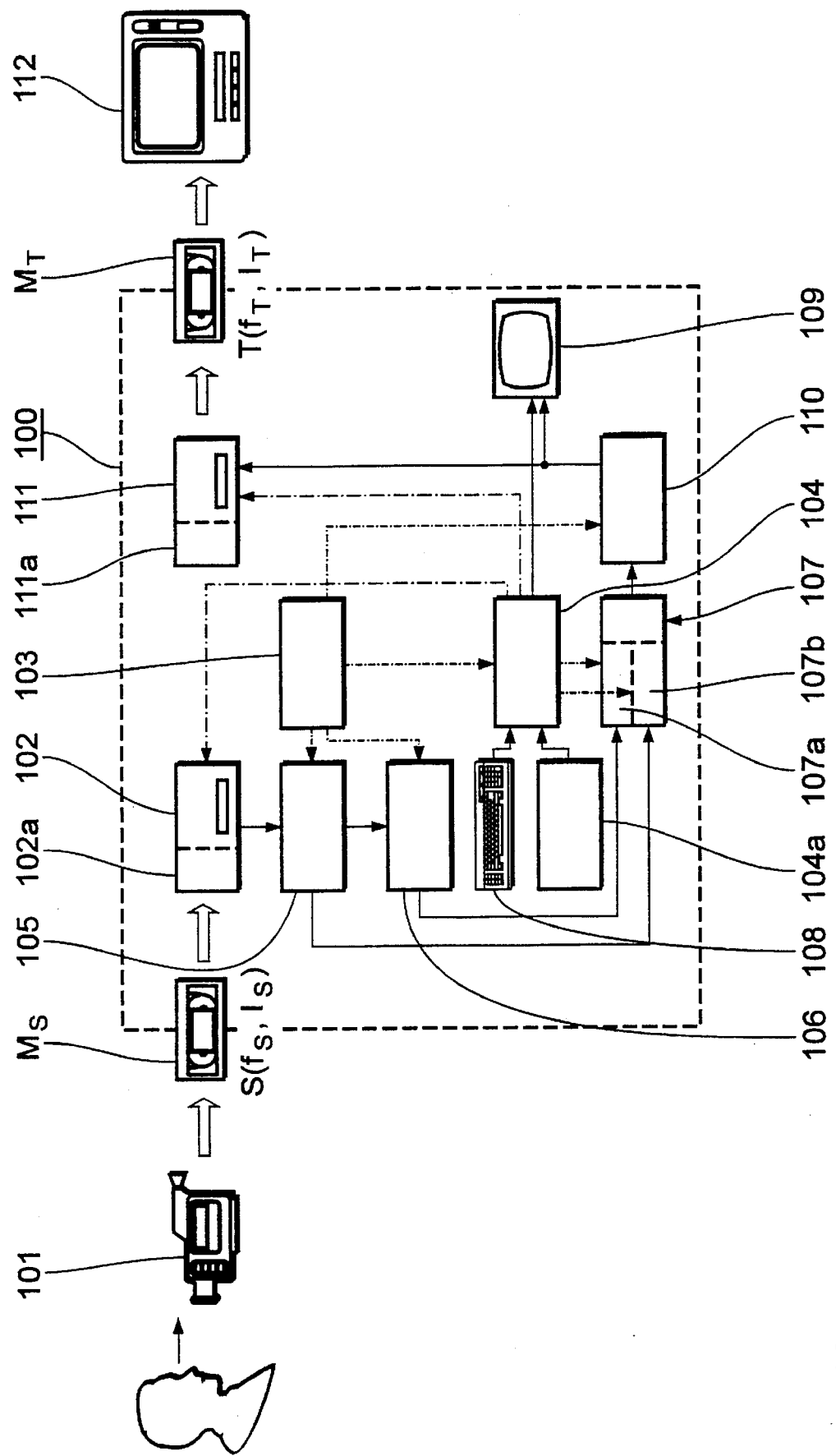
FIG. 16 is a simplified block diagram of an apparatus according to a second embodiment of the invention and FIG. 17 is a simplified block diagram of an apparatus according to a second embodiment of the invention.

In FIG. 16, a conversion apparatus 100 for the production of a second frame sequence T on a second recording medium $M_t$ with a second frame change rate $f_T$ from a first frame sequence S being recorded on a first recording medium Ms with a first frame change rate $f_S$ working on a digital basis is schematically shown as a block diagram of functional components.

The original is a video record S being produced by means of an NTSC-camera 101 with a frame rate of nominally 30 (really 60) frames per second on video tape. This record is handed over to the conversion apparatus 100.

This apparatus comprises a recording device (a first video recorder) 102 working in the NTSC standard as well and comprising a driving unit 102a, a central timer 103, the output of which is connected to control inputs of all other components (except the components 108 and 109, as well as the video camera 101 and the display device 112, which do not form parts of the apparatus 100), a central processing unit (micro-controller, also called an evaluation unit in this application) 104, a first serial image memory 105 (the input of which is connected to the data output of the video recorder 102), and a second serial image memory 106 (the input of which is connected to the data output of the first memory 105). Furthermore, the apparatus 100 comprises a digital mixing apparatus 107 comprising two separately controllable channels 107a, 107b (which mixing apparatus is connected to the data outputs of the memories 105 and 106 as well as to an output of the processing unit 104 and being well-known as such), a third serial image memory 110 (the input of which is connected to the data output of the mixing apparatus 107), an input keyboard 108 (being connected to an input of the processing unit 104), a monitor 109 (being connected to an output of the processing unit 104), and a recording device (a second video recorder) 111 comprising a driving unit 111a and working in the PAL standard. An optical printer 113 may also be provided, wherein an input at the optical printer is connected to an output of the mixing apparatus 107.

A video tape $M_T$ being recorded by means of the video recorder 111 in the PAL standard with nominally 25 (really 50) frames per second, the tape comprising a target frame sequence T, finally is available for reproduction of the record on a PAL reproduction unit 112 after having been output from the conversion apparatus 100.

Prior to starting the conversion procedure, the video tape $M_S$ is loaded in the video recorder 102, a programming of the processing unit 104 for the conversion process (according to the conversion scheme NTSC-PAL as described above in detail) is carried out, and, if necessary, control data (e.g., offset data) are input by means of the input keyboard 108. Thereafter, the timer 103 as well as (synchronized by the timer) the video recorder 102 for reproduction and the video recorder 111 for recording are started.

The reproduction or play mode, respectively, of the video recorder 102 (in a mode which allows for the handling of separate frames by the processing unit 104 and the image memories 105, 106, 110) is controlled by the processing unit 104 (in cooperation with the external timer 103). A j-th frame is loaded from the video recorder 102 into the first image memory 105, which step is as well triggered by the processing unit 104. This frame will be reloaded into the second memory 106 as soon as the next required ([j+1]-th) frame of the source frame sequence appears on the video recorder 102, and at the same time the ([j+1]-th) frame is stored in the memory 105. This means that at each time, two frames of the source video recordings to be used in the synthesis of the i-th target frame are available in a form being suitable for handling them in a digital manner.

After both memories 105 and 106 have been loaded, the processing unit 104 responding to a clock signal of the timer 103 determines the weighing coefficients $C_{j,S}$ and $C_{j+1,S}$ for the j-th and the ([j+1]-th) frame in NTSC standard, and adjusts the signal levels of the channels 107a and 107b correspondingly, starting from the value of j and the program data of the conversion program for the construction of the i-th frame in PAL standard being stored in a memory 104a, e.g., in form of a table. Thereafter, the contents of the memories 105 and 106 each are weighed with the level as adjusted, added in the mixing apparatus 107 pixel per pixel, and the result is loaded into the third image memory 110. From there, the i-th frame of the PAL frame sequence being synthesized in the above manner will be recorded by the second video recorder 111 in response to a clock signal of the timer 103.

The obtained frames or images, respectively, can be observed on the monitor 109, and by means of the keyboard 108 the conversion can be influenced manually if this seems to be necessary. The above described procedure will be repeated as long as the whole frame sequence ("film") originally being available in NTSC Standard has newly been recorded in PAL standard. The conversion in the reverse direction PAL-NTSC would be carried out analogously, similarly as well the conversion into or from a computer graphics mode (of course considering the specific conversion relations to be predetermined within the program).

Figure 17:
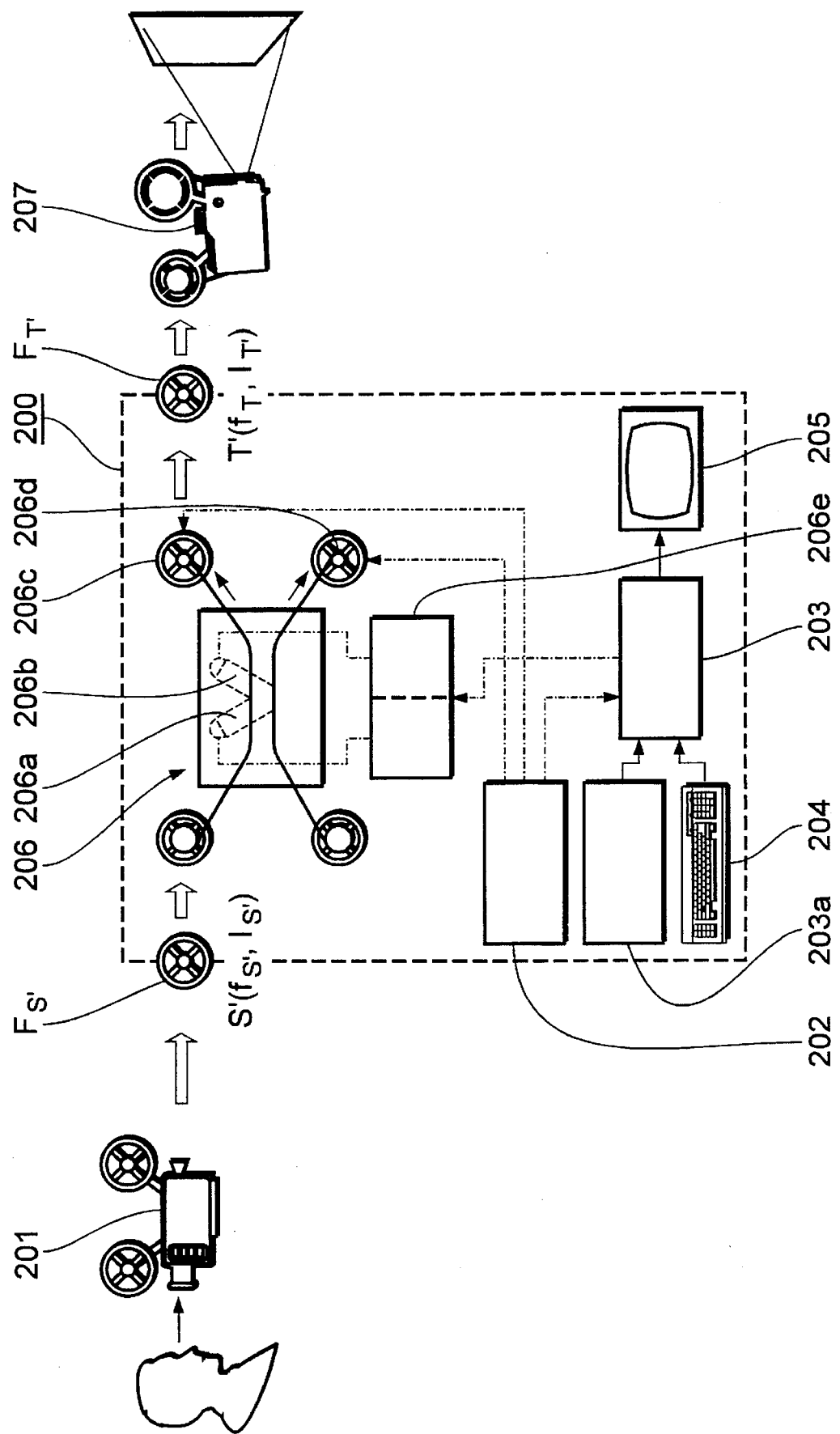

In FIG. 17 a transformation apparatus 200 is schematically illustrated for the production of a second frame sequence T' on a second recording medium $F_T$, with a second frame change rate $f_T$, and a second corresponding frame interval $I_T$, from a first frame sequence S' being recorded on a first recording medium $F_S$, with a first frame change rate $f_S$ and a first corresponding frame interval $I_S$, which apparatus partly uses conventional phototechnical methods. The apparatus 200 is schematically shown as a block diagram of functional components.

The procedure starts from a film record S' being produced by means of a Film 16 camera 201 with a frame rate of 16 frames per second on cinemagraphic film $F_S$.

This film is loaded into the conversion apparatus 200.

This apparatus—similar to the apparatus 100 according to the above described embodiment—comprises a timer 202, a central processing unit (micro-controller, also called an evaluation unit in this application) 203, a transformation table memory 203a, an input keyboard 204 (being connected to an input of the processing unit 203), and a monitor 205 (being connected to an output of the processing unit 203). The input keyboard 204 and the monitor 205 serve for controlling and observing the conversion process. Furthermore, the apparatus 200 comprises a mixing photocopier or double exposure apparatus, respectively, 206 being known as such, and comprising two control inputs being connected to an output of the processing unit 203 and comprising two independently time controllable exposure units 206a, 206b, a transport apparatus 206c for the original film $F_S$, and a transport apparatus 206d for the film copy $F_T$.

A film $F_T$, being exposed in the mixing copier e.g., in Film 24 standard with 24 frames per second, and comprising a target frame sequence T' finally being output from the conversion apparatus 200, is ready for being projected by means of a Film 24 projector 207.

Prior to starting a conversion procedure, the original film $F_S$, is loaded into the mixing copier 206 and the processing unit 203 is programmed for the conversion process (according to the conversion scheme Film 16 to Film 24 explained above). Thereafter, the timer as well as (synchronized by means of the timer) the transport apparatuses 206c and 206d for the original film and for the film to be exposed in the Film 24 standard, respectively, are started.

The film transport of both films is controlled such that a phototechnical single frame handling in the mixing copier 206 is possible in a manner that in every step two neighboring frames $B_{j,S'}$ and $B_{j+1,S'}$ of the original film $F_S$, are exposed on to one frame $B_{i,T'}$ of the film to be exposed. The mixing copier 206 is constructed such that at each time, one of two successive frames of the original film is in the exposure unit 206a and the other is in the unit 206b. A two-channel exposure time controller 206e, which is connected to the output of the processing unit 203, is connected to the mixing copier.

In each step, the processing unit 203, in response to a clock signal of the timer 202, fetches the weighing coefficients $C_{j,S'}$ and $C_{j+1,S'}$ for the j-th and the (j+1)-th frame in Film 16 standard and determines the exposure times for the exposure units 206a, 206b, starting from the value for j being determined by an internal frame counter (not shown in the figure) or being transmitted from a counter of the transport apparatus 206c and the stored program data of the conversion program for the synthesis of the i-th frame in Film 24 standard. Thereafter, an exposure of the i-th frame of the target sequence T' is carried out by means of the exposure time controller 206e and the exposure units 206a, 206b, and thereafter both films are advanced.

The above described procedure will be repeated as long as the whole frame sequence being available in Film 16 standard has newly been recorded in Film 24 standard. The conversion in the reverse direction is carried analogously, similar to the conversion of material being available on cinemagraphic film or being produced as such from the or into the Showscan standard (paying attention to the specific conversion relations to be predetermined within the program).

Within the apparatus as described, additionally, a video recording unit for recording the synthesized frames and reproducing them on the monitor 205 as well as a control unit comprising an input keyboard for optionally manually influencing the mixing procedure can be provided.

The exposure unit alternatively can be constructed as an intensity controlled apparatus wherein the weighing coefficients would be realized by a light dimming process corresponding to its numeral value.

In both apparatuses according to FIGS. 16 and 17, the processing units and their corresponding periphery—in a given case—even including the timer—can especially be microprocessor controlled units, such as a personal computer.

The handling and/or the production of frame sequences existing on photomaterial (including the transformations film-video, video-film, and film-film) is also possible in a digital manner by means of an apparatus similar to that shown in FIG. 16.

In a given case, this apparatus should comprise an A-D image converter at the input, e.g., a film projector and a video camera or a CCD array having an image receiving surface being located in the projection plane for recording the projected images, and/or a film recording apparatus for producing a film of a synthesized frame sequence (e.g., taken from a high definition monitor) at the output. For applications including a D/A conversion, especially the application of a digitally controlled laser of a holographic exposure apparatus, respectively, can be useful.

Various modifications and changes may be made by those skilled in the art without departing from the spirit and scope of the invention as defined in the following claims.

I claim:

1. A process for producing a second frame sequence for giving a visual impression of an event including a temporal dimension to an observer, the process comprising:

producing a second frame sequence, including a second frame change rate and a second frame interval, from a first frame sequence having a first frame change rate and a first frame interval, wherein all of the frames of the second frame sequence are obtained by additively superimposing at least two temporally neighboring frames of the first frame sequence, wherein an intensity amount of each of the at least two neighboring frames for producing a frame of the second frame sequence is determined based on a frame-specific, individually evaluated intensity weighing coefficient, such that the two neighboring frames of the first frame sequence combine together to correspond to a time of the frame in the second frame sequence;

wherein the time of the frame in the second frame sequence is represented by a time location of a characteristic point in time of the second frame interval during which the frame appears in a transmission or reproduction in a transmission or reproduction standard being assigned to the second frame sequence; and wherein a common starting point and time for the first frame sequence and the second frame sequence to be produced is determined, a location in time of each frame of the first frame sequence and a location in time of each frame of the second frame sequence is determined, for each frame of the second frame sequence to be produced, the temporally next neighboring frames of the first frame sequence are determined, a temporal distance or offset of respective time intervals of the next neighboring frames of the first frame sequence with respect to a time interval of the frame of the second frame sequence to be produced is determined, based on their respective characteristic points, for each of the next neighboring frames of the first frame sequence, a frame specific, normalized intensity weighing coefficient is determined which depends on the temporal distance or offset, respectively, of the corresponding time interval with respect to the time interval of the frame of the second frame sequence to be produced, and the frame of the second frame sequence to be produced is formed by additively superimposing the next neighboring frames of the first frame sequence, each being multiplied by its corresponding intensity weighing coefficient.

2. A process according to claim 1, wherein the characteristic point in time is a center time point of the second frame interval.

3. A process according to claim 1, wherein at least one of the first frame sequence or the second frame sequence is recorded on a recording medium.

4. A process according to claim 1, wherein the first frame sequence is available in digital form, and the additively superimposing is carried out by pixel-by-pixel addition of the next two neighboring frames from the first frame sequence, wherein a level of the signals to be added is adjusted according to the corresponding intensity weighing coefficient.

5. A process according to claim 3, wherein the next neighboring frames of the first frame sequence are available in analog form as a photochemically produced record, and the next neighboring frames are digitalized prior to additively superimposing them.

6. A process according to claim 1, wherein the additively superimposing is carried out by multiple exposure of the frame of the second frame sequence with the next neighboring frames of the first frame sequence, wherein at least one of an exposure intensity or an exposure time is adjusted according to the intensity weighing coefficients.

7. A process according to claim 1, wherein a new i-th frame $F_{i,T}(t_i)$ with a time interval with a characteristic point $t_i$ of the second frame sequence T is produced by superimposing two frames $F_{j,s}(t_j)$ of the first frame sequence S comprising characteristic points $t_j$ or $t_{j+1}$, respectively, the next neighboring frames being neighbored to the time $t_i$, the i-th frame $F_{i,T}(t_i)$ is formed in accordance with the relation:

$$F_{i,T}(t_i)=C_{j,s} \cdot F_{j,s}(t_j)+C_{j+1,s} \cdot F_{j+1,s}(t_{j+1}),$$

wherein i and j are integers and $C_{j,s}$, $C_{j+1,s}$ are the intensity weighing coefficients for a j-th or (j+1)-th source frame, respectively, and are evaluated as normalized weighing coefficients $$C_{j,s}=1-(|t_i-t_j|)/(t_{j+1}-t_j),$$

$$C_{j+1,s}=1-(|t_{j+1}-t_i|)/(t_{j+1}-t_j).$$

8. A process according to claim 1, wherein the second frame sequence is formed of a succession of equidistant basic sequences, each being produced in the same way, the time duration of which is determined such that it includes a whole number of frames of the first frame sequence and a whole number of frames of the second frame sequence, and wherein the weighing coefficients for each frame of the second basic sequence are evaluated based on the first and second frame change rates or the first and second frame intervals, respectively, taking account of the presence of black frame intervals or interlaced frames in the first frame sequence or the second frame sequence.

9. An apparatus for producing a second frame sequence for giving a visual impression of an event including a temporal dimension to an observer, the second frame sequence including a second frame change rate and a second frame interval, from a first frame sequence including a first frame change rate and a first frame interval, wherein each of the frames of the second frame sequence is obtained by additively superimposing at least two temporally neighboring frames of the first frame sequence, wherein each of the two neighboring frames is weighed by a frame-specific, individually evaluated intensity weighing coefficient so as to correspond to a time of the frame in the second frame sequence, the apparatus comprising:

- a transmission or reproduction apparatus for transmitting or reproducing the first frame sequence with the first frame change rate and the first frame interval,
- a mixing apparatus for superimposing frames of the first frame sequence to a mixed frame constituting a frame of the second frame sequence,
- a recording or transmitting apparatus for recording or transmitting the second frame sequence as a sequence of frames being reproduced by the mixing apparatus, wherein the second frame sequence has the second frame change rate and the second frame interval, and
- a timer and synchronizer device for synchronously controlling the operation of the transmission or reproduction apparatus, the mixing apparatus and the recording or transmitting apparatus,
- wherein an evaluation unit for evaluating the frame-specific intensity weighing coefficients for the superposition of frames of the first frame sequence in response to signals of the timer and synchronizer device is provided, the evaluation unit being connected to the timer and synchronizer device, and wherein the mixing apparatus includes control means for frame-specifically adjusting the weighing coefficients for each mixing step, the control means being connected to the output of the evaluation unit.

10. An apparatus according to claim 9, wherein at least one electronic image memory for temporarily storing at least one of two frames of the first frame sequence, wherein a data output of the memory is connected to the mixing apparatus, and the mixing apparatus is provided for adding image contents of the memory, available in digital form, pixel-by-pixel.

11. An apparatus according to claim 9, wherein digitizing means is provided for digitizing analog recorded frames, wherein the digitizing means is provided at an input of the mixing apparatus or the electronic image memory.

12. An apparatus according to claim 9, wherein the mixing apparatus includes an optical copier apparatus with two separately drivable exposure units each including control units which are connected to an output of the evaluation unit for exposing successive frames of the first frame sequence being introduced into the copier apparatus on a first recording medium onto a second recording medium, wherein at least one of an exposure intensity or an exposure time for each frame of the first frame sequence is adjusted in accordance with the weighing coefficient.

13. An apparatus according to claim 9, wherein an electronical image mixing apparatus and an optical printer are provided, wherein an input of the optical printer is connected to an output of the mixing apparatus.

* * * * *